US008428754B2

(12) United States Patent
Wong

(10) Patent No.: US 8,428,754 B2
(45) Date of Patent: *Apr. 23, 2013

(54) METHOD, SYSTEM AND APPARATUS FOR CONTROLLING AN ELECTRICAL DEVICE

(76) Inventor: Larry Wong, Richmond Hill (CA)

( * ) Notice: Subject to any disclaimer, the term of this patent is extended or adjusted under 35 U.S.C. 154(b) by 27 days.

This patent is subject to a terminal disclaimer.

(21) Appl. No.: 13/329,746

(22) Filed: Dec. 19, 2011

(65) Prior Publication Data
US 2012/0092192 A1 Apr. 19, 2012

Related U.S. Application Data

(62) Division of application No. 11/966,230, filed on Dec. 28, 2007, now Pat. No. 8,108,055.

(51) Int. Cl.
*G05B 11/01* (2006.01)
*G05B 13/02* (2006.01)
*H04N 7/18* (2006.01)

(52) U.S. Cl.
USPC ............. 700/28; 700/17; 700/18; 700/19; 700/20; 348/135; 348/143

(58) Field of Classification Search .......... 700/17–20, 700/28; 382/100, 103, 24, 38, 118; 340/932.2, 340/910; 348/135, 143
See application file for complete search history.

(56) References Cited

U.S. PATENT DOCUMENTS

| | | | | |
|---|---|---|---|---|
| 3,097,295 A | * | 7/1963 | Williams | 377/9 |
| 4,277,727 A | * | 7/1981 | LeVert | 315/155 |
| 5,031,228 A | * | 7/1991 | Lu | 382/227 |
| 5,374,854 A | * | 12/1994 | Chen | 307/117 |
| 5,432,508 A | * | 7/1995 | Jackson | 340/932.2 |
| 5,809,161 A | * | 9/1998 | Auty et al. | 382/104 |
| 5,973,732 A | * | 10/1999 | Guthrie | 348/169 |
| 6,005,958 A | * | 12/1999 | Farmer et al. | 382/103 |

(Continued)

FOREIGN PATENT DOCUMENTS

| | | |
|---|---|---|
| CA | 2161873 | 11/1994 |
| CA | 2448 452 A1 | 12/2002 |

(Continued)

OTHER PUBLICATIONS

Int'l Application No. PCT/CA2008/002189, Wong—Int'l Filing Date Dec. 28, 2007, Int'l Publication No. WO 2009/082810 A1—Published Sep. 7, 2009, Int'l Search Report, 4 pages.

(Continued)

*Primary Examiner* — Ronald Hartman, Jr.
(74) *Attorney, Agent, or Firm* — Reising Ethington, P.C.

(57) ABSTRACT

A system, method and apparatus for controlling an electrical device are provided. At least one image of at least one moving entity is processed to determine when the moving entity (or entities) is at least one of entering and exiting a monitored area, and to determine when the moving entity (or entities) comprises at least one triggering shape. When the moving entity (or entities), comprising at least one triggering shape, is at least one of entering and exiting the monitored area, control of the electrical device is triggered and a counter for counting triggering shapes present in the monitored area is triggered. When the moving entity (or entities), comprising at least one triggering shape, exits the monitored area, the counter decrements by the number of triggering shapes and the electrical device is triggered to a state different from a present state when the counter falls below a threshold number.

23 Claims, 14 Drawing Sheets

U.S. PATENT DOCUMENTS

| | | | |
|---|---|---|---|
| 6,608,910 B1* | 8/2003 | Srinivasa et al. | 382/100 |
| 6,694,259 B2* | 2/2004 | Curbow et al. | 701/523 |
| 6,696,945 B1* | 2/2004 | Venetianer et al. | 340/541 |
| 6,750,786 B1* | 6/2004 | Racunas, Jr. | 340/932.2 |
| 6,781,523 B2* | 8/2004 | Matsui et al. | 340/910 |
| 7,312,722 B2* | 12/2007 | Tillotson et al. | 340/932.2 |
| 7,382,895 B2* | 6/2008 | Bramblet et al. | 382/103 |
| 7,439,847 B2* | 10/2008 | Pederson | 340/5.81 |
| 7,477,780 B2* | 1/2009 | Boncyk et al. | 382/165 |
| 7,504,942 B2 | 3/2009 | Marman | |
| 7,612,796 B2* | 11/2009 | Lev-Ran et al. | 348/143 |
| 7,631,808 B2 | 12/2009 | Kundu et al. | |
| 7,711,157 B2 | 5/2010 | Duong et al. | |
| 7,734,102 B2 | 6/2010 | Bergeron et al. | |
| 2002/0152298 A1* | 10/2002 | Kikta et al. | 709/223 |
| 2004/0179736 A1 | 9/2004 | Yin | |
| 2005/0105771 A1 | 5/2005 | Nagai et al. | |
| 2007/0285510 A1* | 12/2007 | Lipton et al. | 348/135 |
| 2008/0136625 A1 | 6/2008 | Chew | |
| 2009/0324010 A1 | 12/2009 | Hou | |

FOREIGN PATENT DOCUMENTS

| | | |
|---|---|---|
| CA | 2357681 A1 | 12/2002 |
| FR | 2 894 700 A1 | 6/2007 |
| GB | 2121212 A * | 5/1982 |
| WO | WO 01/69542 A1 | 9/2001 |

OTHER PUBLICATIONS

PCT International Preliminary Report on Patentability, International Application No. PCT/CA2008/002189, International Filing Date Dec. 18, 2008, 5 pages.

Eastek Systems GmbH, Statisiktool CINSIGHT & Crosscan Laufwegerkennung, http://www.kundenzaehlung.de/crosscan.html, retrieved Oct. 8, 2009, 2 pages.

PCN-1001-Optical Passenger Counter in IP65 case, EN51055 T1 certification, RS-485 serial port and isolated digital I/O, http://www.eurotech.com/EN products.aspx?pg=PCN-1001&pc=415, retrieved Oct. 8, 2009, 2 pages.

Honeywell Video Systems, People Counter, https://honeywellvideo.com/products/ias/va/160978.html, retreived Oct. 8, 2009, 3 pages.

Chinese Office Action dated Aug. 10, 2011, Chinese Application No. 200810210163.7, Applicant: Larry Wong, Title: Method, System and Apparatus for Controlling Electrical Device, 5 pages.

Translation of Chinese Office Action dated Aug. 10, 2011, Chinese Application No. 200810210163.7, Applicant: Larry Wong, Title: Method, System and Apparatus for Controlling Electrical Device, 12 pages.

* cited by examiner

| Shape Description (Optional) | Reference Triggering Shape |
|---|---|
| Adult | 710 — 730 720 |
| Child | 710 — 730 720 |
| Pregnant Woman | 740 710 — 730 720 |

Fig. 7

METHOD, SYSTEM AND APPARATUS FOR CONTROLLING AN ELECTRICAL DEVICE

CROSS-REFERENCE TO RELATED APPLICATION

This application is a divisional application of U.S. patent application Ser. No. 11/966,230, filed Dec. 28, 2007 and claims priority there from. The content of the aforementioned application is incorporated herein by reference in its entirety.

FIELD

The invention relates to energy management, and in particular to a method, system, and apparatus for controlling an electrical device.

BACKGROUND

The need for energy efficiency is often at odds with established patterns of human behaviour. It is often difficult to balance convenience with a reduction in energy use in a home or office where other matters may take priority, such as dealing with work projects or family needs. In many cases lights or other electrical devices are left on in a space, thereby expending energy without the presence of people in the space.

Prior art solutions dealing with this problem include the use of motion sensors and counters that are hard-wired to local light switches to turn off the lights when people are not present. However, these solutions have a number of shortcomings. First, because the motion sensors or counters have to be hard-wired to the light switch, the cost and hassle of installing such devices in a building becomes significant, especially in buildings with many rooms and spaces.

Second, room counters are configured to count the number of entries and exits to a space (e.g. as disclosed in U.S. Pat. No. 5,374,854). If a parent carries a child into an empty room, the counter will only count one entry to the room. And if the parent or child leaves separately, the count will be decremented and the lights will go out despite the fact that someone is left within the room. Moreover, because a counter is designed to be hard-wired to the light switch two additional problems arise. First, if the room has multiple doorways there is no way to reconcile information collected by counters provided at each doorway to the room. As such, a counter can only be used effectively if the room has only one doorway. Second, the space must be enclosed, which means spaces around a building cannot employ counters. The counters described in the prior art cannot be used to control the lights in a space outside of the building, such as in a garden or landing area.

SUMMARY

According to an aspect of an embodiment of the invention, there is provided a lighting control system including: a switching circuit array connectable to a circuit breaker in a building for controlling electricity flow in a plurality of circuits, wherein each of the plurality of circuits is used for lighting in a corresponding plurality of spaces; a radio receiver for receiving and demodulating wireless signals to recover data modulated thereon; a controller connectable to the radio receiver for accepting demodulated data and connectable to the switching circuit array for providing control signals thereto, the controller having a computer program product including computer usable program code for processing demodulated data from the radio receiver to produce control signals for the switching circuit, the computer usable program code including program instructions for: determining from which particular space the demodulated data corresponds to; determining whether the demodulated data is from a motion sensor or a counter in a particular space; when from a motion sensor, determining whether the motion sensor has detected motion in the particular space, and when motion has been detected one of maintaining electricity flow to the circuit corresponding to the particular space and turning on electricity flow to the particular space, and when motion has not been detected turning off electricity flow to the particular space; and when from a counter, determining whether the demodulated data from the counter indicates that the particular space is unoccupied or occupied, and when occupied one of maintaining electricity flow to the circuit corresponding to the particular space and turning on electricity flow to the particular space, and when unoccupied checking for demodulated data received from a corresponding motion sensor associated with the same particular space. In some embodiments, some of the plurality of spaces are within the building. In some other embodiments, some of the plurality of spaces are in the proximity of the building. In some more specific embodiments, some of the plurality of spaces are outside the building.

In some embodiments, the lighting control systems includes at least one counter provided to count the number of entries and exits from a space, and the counter includes a radio transmitter for transmitting data corresponding to the number of entries and exits from the space. In some embodiments, at least one of the spaces is a room with at least one doorway and a counter is provided at each doorway to the room.

In some embodiments, the lighting control system includes a motion sensor for detecting motion, and a motion sensor including a radio transmitter for transmitting data corresponding to motion detected in the space. In some embodiments, at least one of the spaces is a room where a suitable number of motion sensors are provided therein to detect motion in substantially the entire room.

In some embodiments, the computer program code includes instructions for processing an override signal from a user to enable a user to disconnect the lighting control system from the circuit breaker.

In some embodiments, the lighting control system includes at least one override switch connectable to the switching circuit array to enable a user to disconnect the lighting control system from the circuit breaker.

In some embodiments, the lighting control system includes at least one override switch connectable to the controller to enable a user to disconnect the lighting control system from the circuit breaker. In some embodiments, the override signal is receivable by the radio receiver from a user device. In some more specific embodiments, the user device is one of a cell phone, a remote control, and a Personal Digital Assistant capable of transmitting a wireless signal to the radio Rx.

According to an aspect of an embodiment of the invention, there is provided a method of controlling lighting, including: receiving information from a space sensor wirelessly that indicates the presence or absence of people in the space; determining whether the information received indicates that a person is in the space; and turning on or off the electricity flow to the space depending on whether the information received indicates that a person is in the space.

In some embodiments, the space is one of a plurality of spaces. In some more specific embodiments, some of the plurality of spaces are within a building. In some other more specific embodiments, some of the plurality of spaces are in the proximity of a building. In some even more specific embodiments, some of the plurality of spaces are outside the building.

In some embodiments, turning on or off electricity flow comprises signalling a switching circuit array connectable to a circuit breaker in a building for controlling electricity flow in a plurality of circuits, wherein each of the plurality of circuits is used for lighting in a corresponding plurality of spaces.

In some embodiments, receiving information comprises providing a radio receiver for receiving and demodulating wireless signals to recover data modulated thereon. In some embodiments, determining whether the information received indicates that a person is in the space comprises providing a controller connectable to the radio receiver for accepting demodulated data and connectable to the switching circuit array for providing control signals thereto, the controller having a computer program product including computer usable program code for processing demodulated data from the radio receiver to produce control signals for the switching circuit.

In some embodiments, the method also includes: determining from which particular space the demodulated data corresponds to; determining whether the demodulated data is from a motion sensor or a counter in a particular space; when from a motion sensor, determining whether the motion sensor has detected motion in the particular space, and when motion has been detected, one of maintaining electricity flow to the circuit corresponding to the particular space and turning on electricity flow to the particular space, and when motion has not been detected turning off electricity flow to the particular space; and when from a counter, determining whether the demodulated data from the counter indicates that the particular space is unoccupied or occupied, and when occupied one of maintaining electricity flow to the circuit corresponding to the particular space and turning on electricity flow to the particular space, and when unoccupied checking for demodulated data received from a corresponding motion sensor associated with the same particular space.

In some embodiments, the method also includes: counting the number of entries and exits from a space; and transmitting data corresponding to the number of entries and exits from the space wirelessly to a controller. In some more specific embodiments, the method also includes providing a counter at each doorway to each space.

In some embodiments, the method also includes providing a motion sensor for detecting motion; and a radio transmitter for transmitting data corresponding to motion detected in the space wirelessly to a controller. In some more specific embodiments, providing a suitable number of motion sensors in a space to detect motion in substantially the entire space.

In some embodiments, the method also includes processing an override signal from a user to enable a user to disconnect a lighting control system from a circuit breaker. In some more specific embodiments, the method also includes providing at least one override switch connectable to a switching circuit array to enable a user to disconnect the lighting control system from the circuit breaker. In some other more specific embodiments, the method also includes providing at least one override switch connectable to a controller to enable a user to disconnect the lighting control system from the circuit breaker.

In some embodiments, the method also includes receiving the override signal using a radio receiver in wireless communication with a user device. In some more specific embodiments, the user device is one of a cell phone, a remote control, and a Personal Digital Assistant capable of transmitting a wireless signal to the radio Rx.

The present specification provides a method of controlling an electrical device. The method comprises processing at least one image of at least one moving entity for determining when the at least one moving entity is at least one of entering and exiting a monitored area, and for determining when the at least one moving entity comprises at least one triggering shape. The method further comprises, when the at least one moving entity is determined to be at least one of entering and exiting the monitored area, and the at least one moving entity comprises the at least one triggering shape, triggering control of the electrical device and triggering a counter for counting triggering shapes present in the monitored area. The method further comprises, when the at least one moving entity is determined to be exiting the monitored area, and the at least one moving entity comprises at least one triggering shape, triggering the counter comprises triggering the counter to decrement by the number of triggering shapes, and triggering control of the electrical device comprises triggering control of the electrical device to a state different from a present state, when the counter falls below a threshold number.

In some embodiments of the method of controlling an electrical device provided, the method further comprises receiving the at least one image via at least one camera mounted proximal to at least one entrance to the monitored area.

In other embodiments of the method of controlling an electrical device provided, processing the at least one image for determining when the at least one moving entity is at least one of entering and exiting a monitored area comprises processing at least one image to determine a direction of movement of the at least one moving entity.

In further embodiments of the method of controlling an electrical device provided, processing the at least one image for determining when the at least one moving entity comprises at least one triggering shape comprises comparing the at least one image to at least one record of triggering shapes. In some of these embodiments, the at least one record of triggering shapes is stored in a database. In other embodiments, the method further comprises receiving an indication of a preference of the behaviour of the electrical device during future control of the electrical device and saving the indication of a preference in association with the triggering shape. In yet other embodiments, the at least one record of triggering shapes further comprises an indication of a state to which the at least one electrical device is controlled responsive to the triggering control of the electrical device.

In yet further embodiments of the method of controlling an electrical device provided, the method further comprises determining when the at least one moving entity comprises at least one non-triggering shape by comparing the at least one image to at least one record of non-triggering shapes.

In some embodiments of the method of controlling an electrical device provided, triggering control of the electrical device comprises triggering at least one of activation or deactivation of the electrical device.

In other embodiments of method of controlling an electrical device provided, triggering control of the electrical device comprises triggering control of a given feature of the electrical device.

In further embodiments of the method of controlling an electrical device provided, the method further comprises determining when the at least one triggering shape is associated with the electrical device, and triggering control of the electrical device occurs only when the at least one triggering shape is associated with the electrical device. In some of these embodiments, the method further comprises determining when the at least one triggering shape is associated with a given feature of the electrical device, and triggering control comprises triggering control of the given feature. In some of these embodiments, the method further comprises detecting an adjustment of the electrical device following the triggering control of the electrical device. In some of these embodiments, detecting an adjustment of the electrical device following the control of the electrical device occurs within a given time period. In other embodiments, the method further comprises saving a record of the adjustment in association with the at least one triggering shape. In further embodiments, the method further comprises processing the record of the adjustment to change behaviour of the electrical device when triggering control of the electrical device. In some embodiments, determining when the at least one triggering shape is associated with the electrical device is based on a size of the at least one triggering shape. In other embodiments, determining when the at least one triggering shape is associated with the electrical device is based on distinguishing when the triggering shape is an adult or a child.

In yet further embodiments of the method of controlling an electrical device provided, the method further comprises processing the at least one image for determining when the at least one moving entity comprises a plurality of entities and, when so, determining a shape of each of the plurality of entities, and wherein the determining when the at least one moving entity comprises at least one triggering shape comprises determining when the shape of each of the plurality of entities comprises a triggering shape and the triggering the counter comprises triggering the counter to increment by the number of triggering shapes in the plurality of entities.

In other embodiments of the method of controlling an electrical device provided, triggering control of the electrical device comprises triggering control of the device to a given state, is the electrical device is not presently in the given state.

In further embodiments of the method of controlling an electrical device provided, the at least one moving entity comprises a vehicle, the monitored area comprises at least one of a parking garage, at least one floor of the parking garage and at least one aisle of the floor, and the counter comprises a display device for displaying the number of parking spaces available in the monitored area.

The present specification provides a controller for triggering control of at least one electrical device. The controller comprises an interface enabled to communicate with at least one camera for monitoring at least one entrance of at least one monitored area associated with the at least one electrical device, such that the at least one image of at least one moving entity may be received from the at least one camera, the interface further enabled to transmit control signals to at least one switch for controlling the at least one electrical device. The controller further comprises a processor enabled for: processing the at least one image of the at least one moving entity, for determining when the at least one moving entity is at least one of entering and exiting the at least one monitored area, and for determining when the at least one moving entity comprises at least one triggering shape; and when the at least one moving entity is determined to be at least one of entering and exiting the at least one monitored area, and the at least one moving entity comprises the at least one triggering shape, triggering control of the at least one electrical device by transmitting at least one control signal to the at least one switch, and triggering at least one counter for counting triggering shapes present in the at least one monitored area; wherein when the at least one moving entity is determined to be exiting the monitored area, and the at least one moving entity comprises at least one triggering shape, triggering the counter comprises triggering the counter to decrement by the number of triggering shapes, and triggering control of the electrical device comprises triggering control of the electrical device to a state different from a present state, when the counter falls below a threshold number.

The present specification provides a system for controlling at least one electrical device comprising at least one camera mounted proximal to at least one of an entrance and an exit of a monitored area associated with the at least one electrical device, such that the at least one camera is enabled to capture images of moving entities that are at least one of entering and exiting the monitored area. The system further comprises at least one switch for controlling the at least one electrical device. The system further comprises a controller for triggering control of the at least one electrical device. The controller comprises an interface enabled to communicate with the at least one camera, such that images of moving entities may be received from the at least one camera, the interface further enabled to transmit control signals to the at least one switch for controlling the at least one electrical device. The controller further comprises a processor enabled for: processing the images, for determining when the moving entities are at least one of entering and exiting the at least one monitored area, and for determining when the moving entities comprise at least one triggering shape; and when the moving entities are determined to be at least one of entering and exiting the at least one monitored area, and the moving entities comprise the at least one triggering shape, triggering control of the at least one electrical device by transmitting at least one control signal to the at least one switch, and triggering at least one counter for counting triggering shapes present in the at least one monitored area; wherein when the at least one moving entity is determined to be exiting the monitored area, and the at least one moving entity comprises at least one triggering shape, triggering the counter comprises triggering the counter to decrement by the number of triggering shapes, and triggering control of the electrical device comprises triggering control of the electrical device to a state different from a present state, when the counter falls below a threshold number.

BRIEF DESCRIPTIONS OF THE DRAWINGS

Embodiments are described with reference to the following figures, in which.

Figure 6:
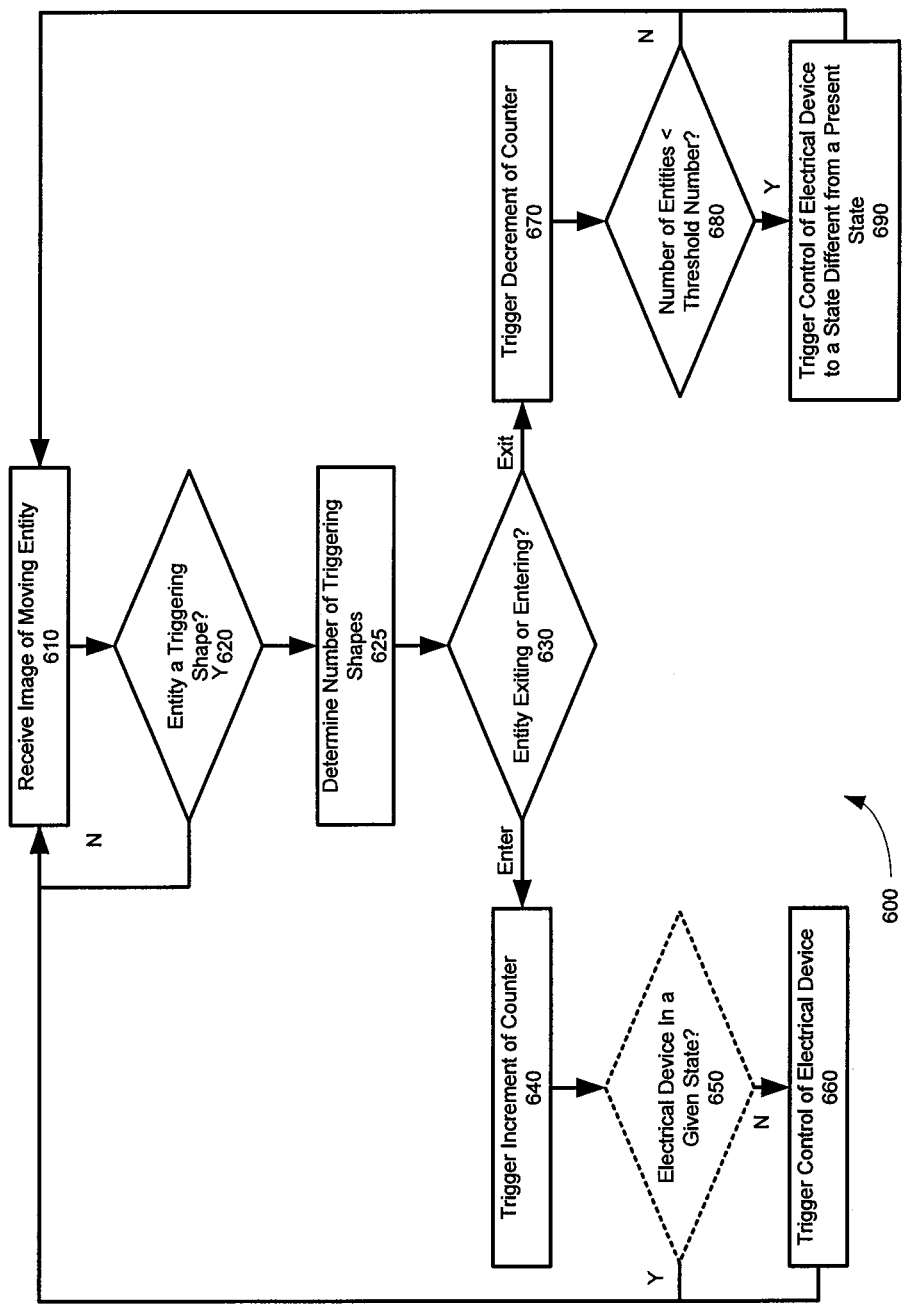
Figure 8:
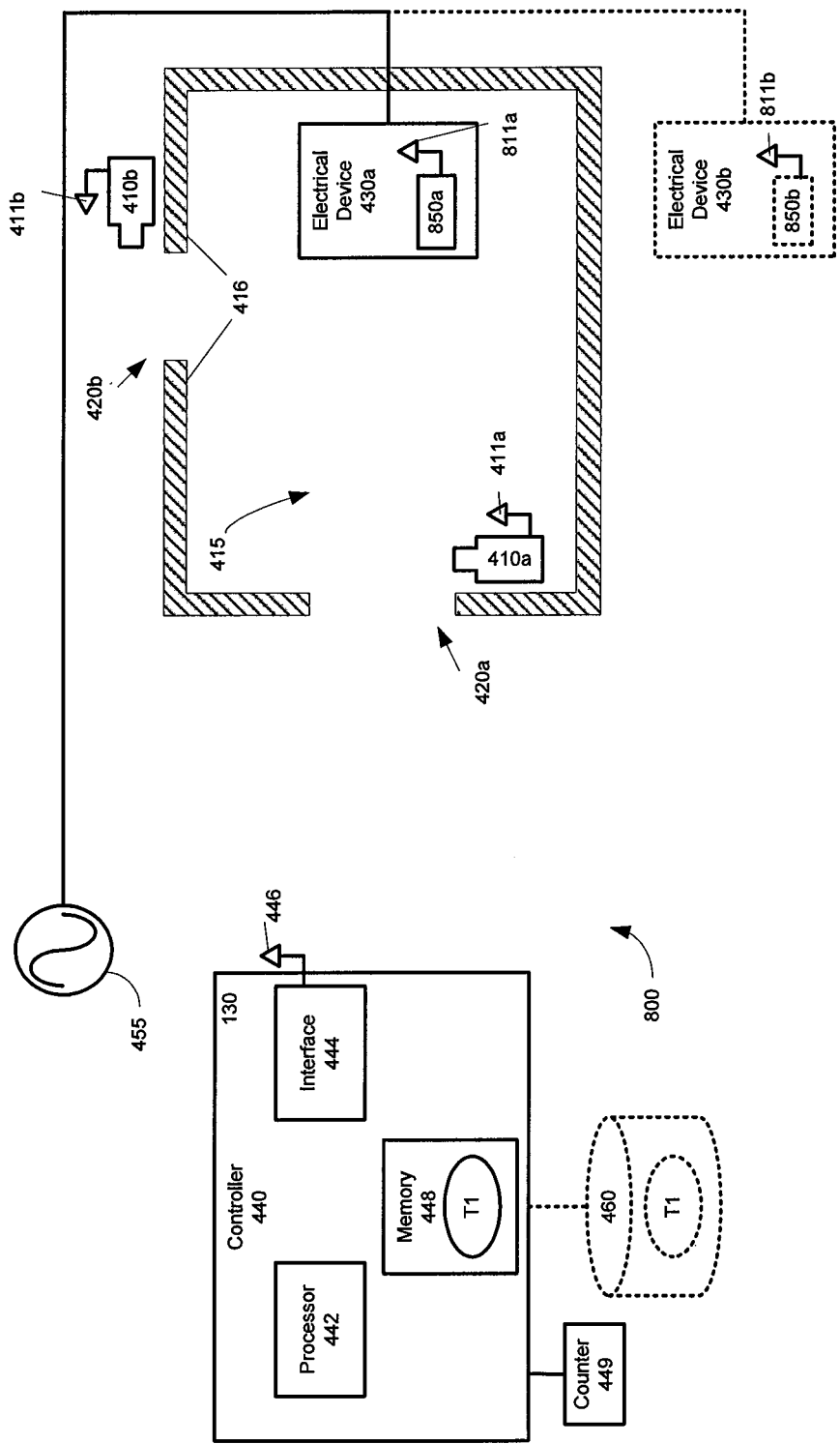
Figure 9:
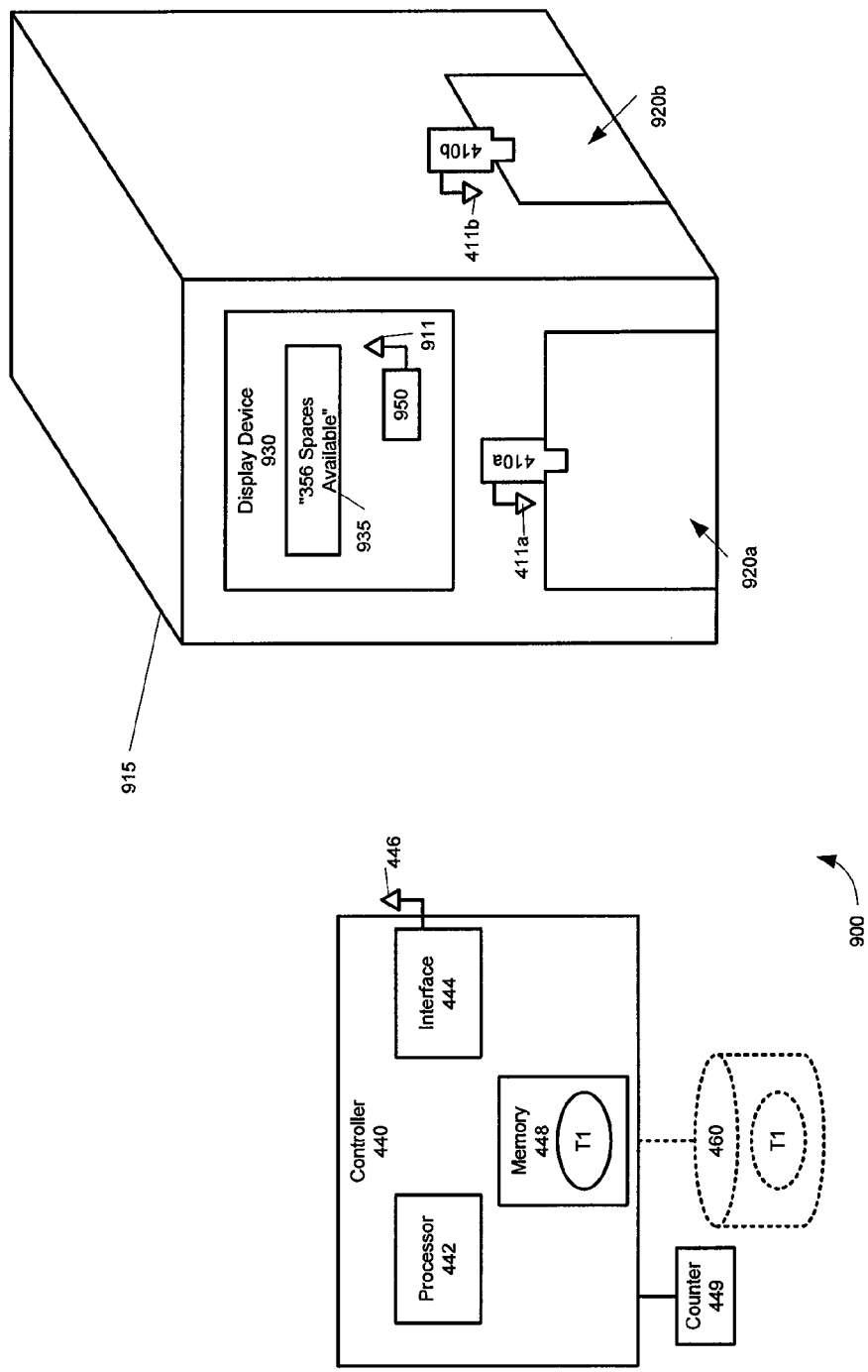
Figure 10:
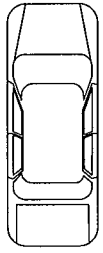
Figure 11:
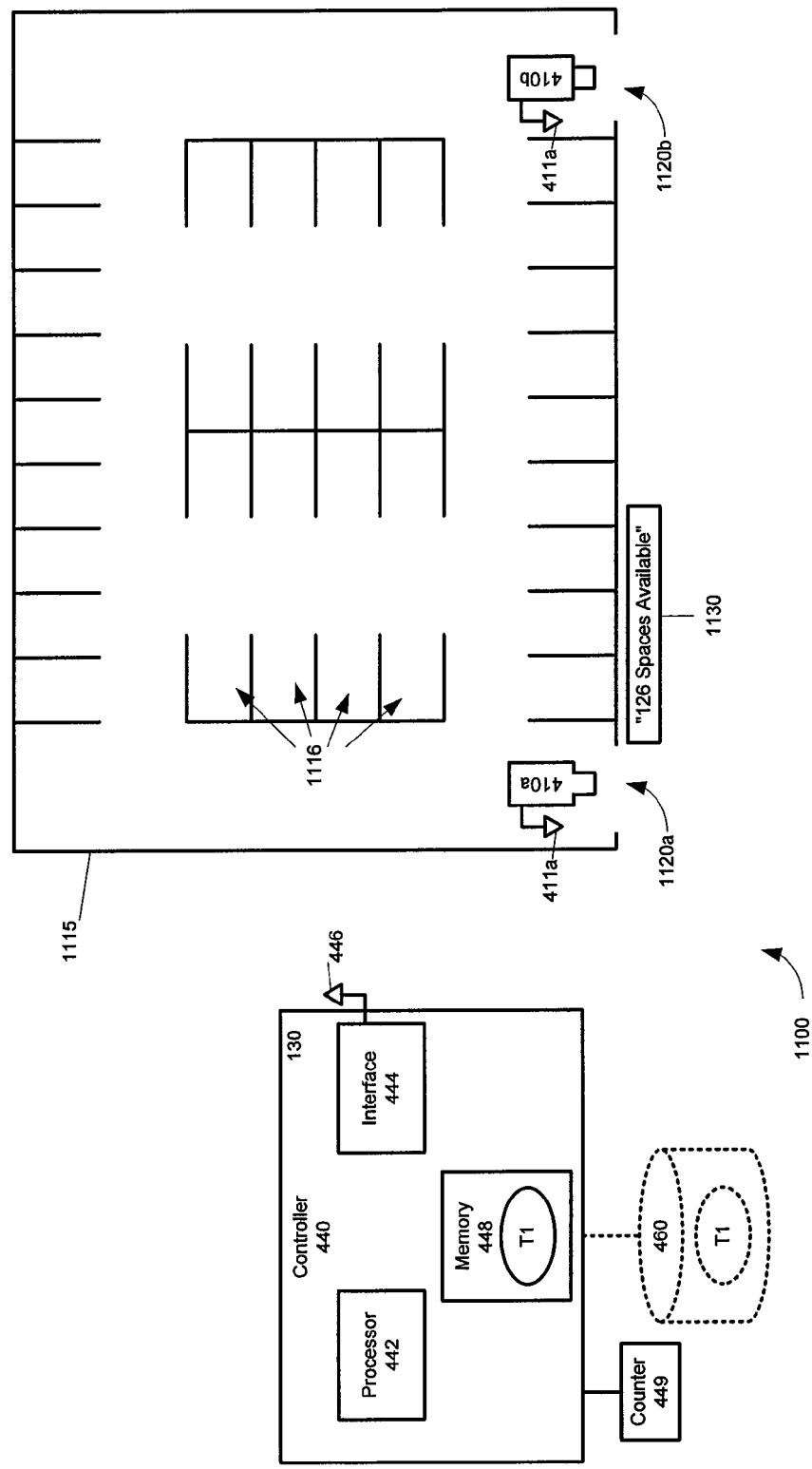
Figure 12:
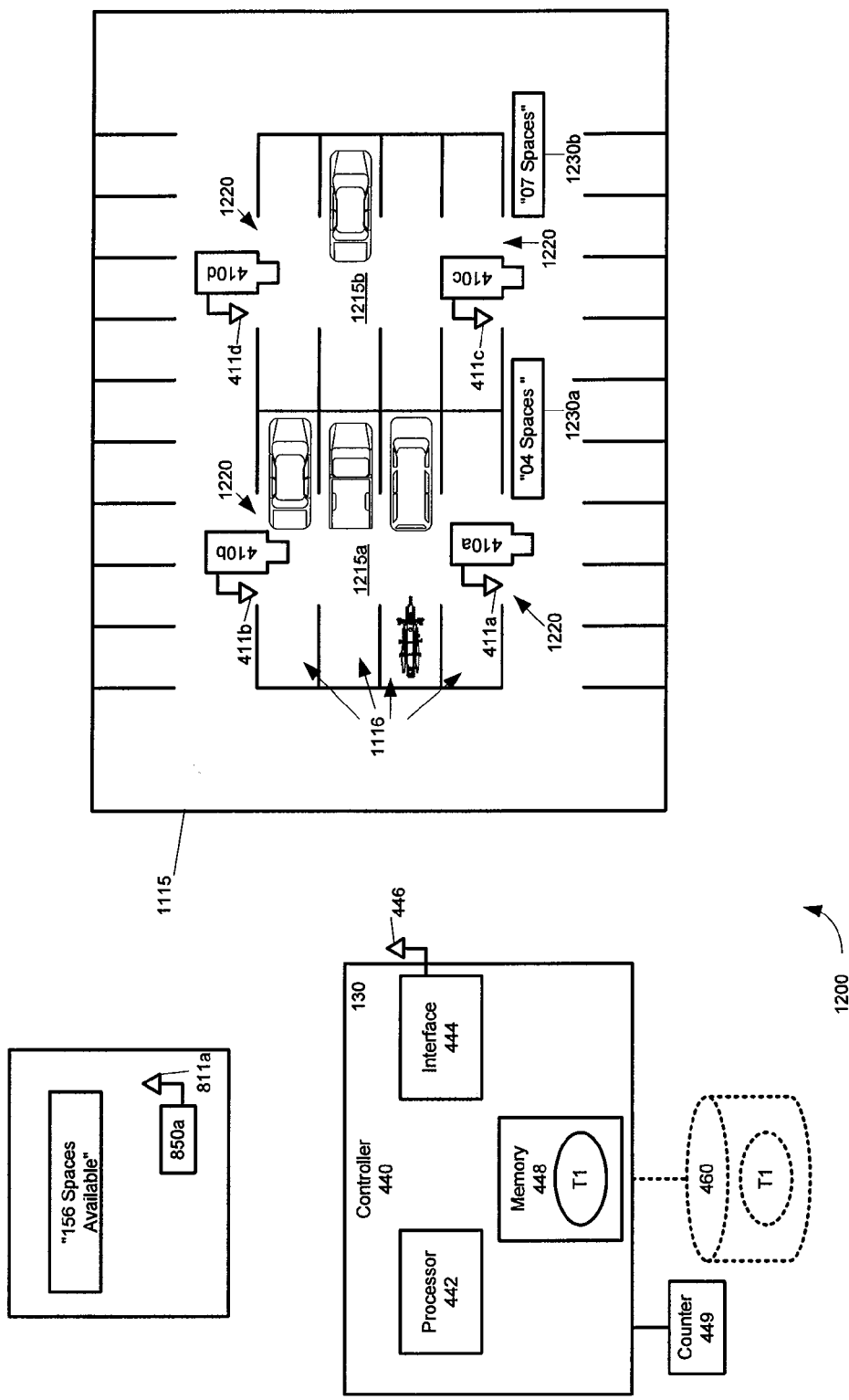
Figure 13:
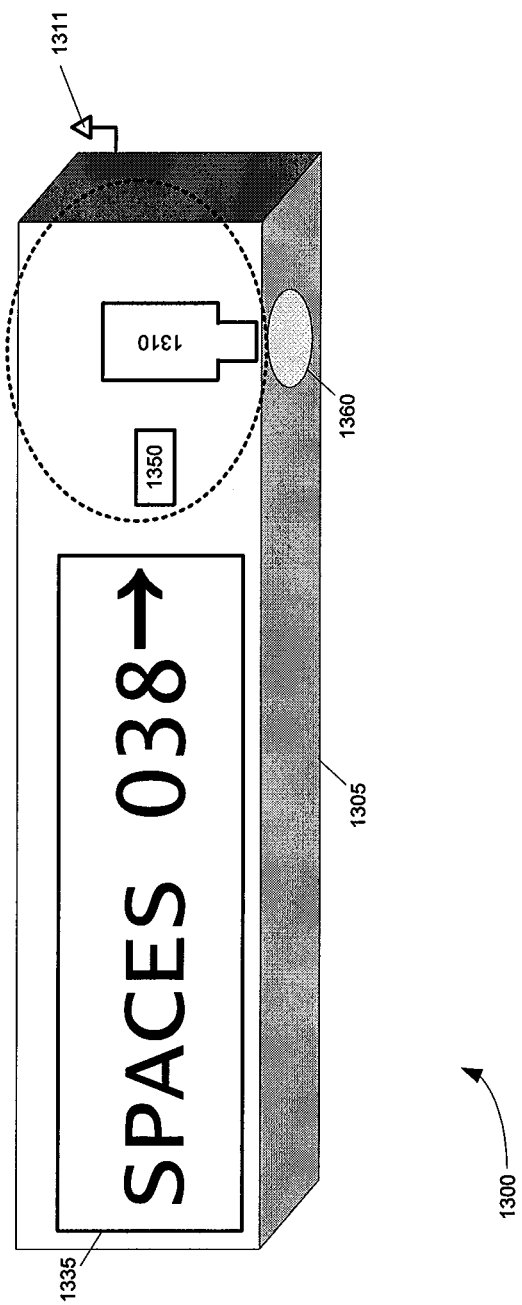
Figure 14B:
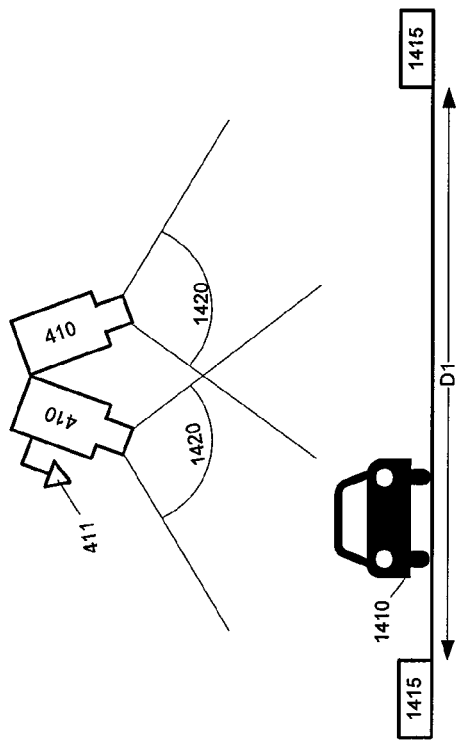
Figure 14A:
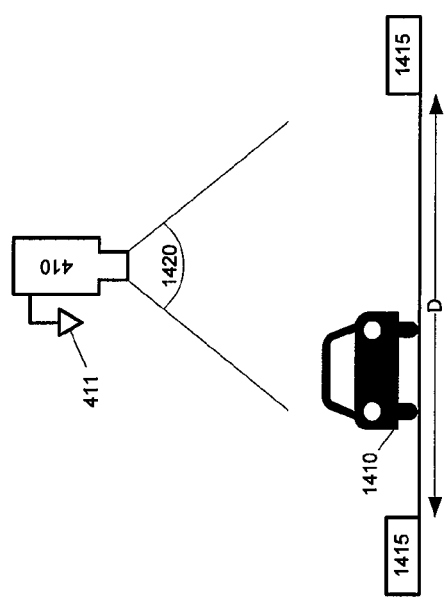

FIG. 6 method of controlling an electrical device, according to a non-limiting embodiment;

FIG. 7 depicts a table of triggering shapes, according to a non-limiting embodiment;

FIG. 8 depicts an electrical device control system, according to a non-limiting embodiment;

FIG. 9 depicts an electrical device control system for a parking garage, according to a non-limiting embodiment;

FIG. 10 depicts a table of triggering shapes for the system of FIG. 9, according to a non-limiting embodiment;

FIG. 11 depicts an electrical device control system for a floor of a parking garage, according to a non-limiting embodiment;

FIG. 12 depicts an electrical device control system for aisles of a parking garage, according to a non-limiting embodiment;

FIG. 13 depicts a display device for a parking garage, according to a non-limiting embodiment; and FIGS. 14a and 14b depict non-limiting embodiments for mounting cameras, according to non-limiting embodiments of the systems depicted in FIGS. 9, 11 and 12.

DETAILED DESCRIPTION OF THE EMBODIMENTS

Prior art options for controlling electrical devices in and around a building are limited in their scope and application. In contrast, systems and methods provided in accordance with non-limiting embodiments provide a broader application of control options for lights and other electrical devices, and reduce the complexity of deploying and installing such systems in a building. In particular, in accordance with non-limiting embodiments there is provided a system for controlling lights and other electrical devices. The system comprises a switching circuit array connectable to a circuit breaker in a building for controlling electricity flow in a plurality of circuits; a radio receiver for receiving and demodulating wireless signals to recover data modulated thereon; and a controller connectable to the radio receiver for accepting demodulated data and connectable to the switching circuit array for providing control signals thereto. The controller has a computer program product including computer usable program code for processing demodulated data from the radio receiver to produce control signals for the switching circuit. In one embodiment, the computer usable program code including program instructions for: determining from which particular space the demodulated data corresponds to; determining whether the demodulated data is from a motion sensor or a counter in a particular space; if from a motion sensor, determining whether the motion sensor has detected motion in the particular space, and if motion has been detected one of maintaining electricity flow to the circuit corresponding to the particular space and turning on electricity flow to the particular space, and if motion has not been detected turning off electricity flow to the particular space; and if from a counter, determining whether the demodulated data from the counter indicates that the particular space is unoccupied or occupied, and if occupied one of maintaining electricity flow to the circuit corresponding to the particular space and turning on electricity flow to the particular space, and if unoccupied checking for demodulated data received from a corresponding motion sensor associated with the same particular space.

Aspects of the invention may be embodied in a number of forms. For example, various aspects of the invention can be embodied in a suitable combination of hardware, software and firmware. In particular, some embodiments include, without limitation, entirely hardware, entirely software, entirely firmware or some suitable combination of hardware, software and firmware. In a preferred embodiment, the invention is implemented in a combination of hardware and firmware, which includes, but is not limited to firmware, resident software, microcode, etc.

Additionally and/or alternatively, aspects of the invention can be embodied in the form of a computer program product that is accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by, or in connection with, the instruction execution system, apparatus, or device.

In accordance with aspects of the invention, a data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Additionally and/or alternatively, in accordance with aspects of the invention, a data processing system suitable for storing and/or executing program code will include at least one processor integrated with memory elements through a system bus.

Input/output (i.e. 110 devices)—including but not limited to keyboards, touchpads, displays, pointing devices, etc.—can be coupled to the system either directly or through intervening 110 controllers.

Network adapters may also be coupled to the system to enable communication between multiple data processing systems, remote printers, or storage devices through intervening private or public networks. Modems, cable modems and Ethernet cards are just a few of the currently available types of network adapters.

Figure 1:
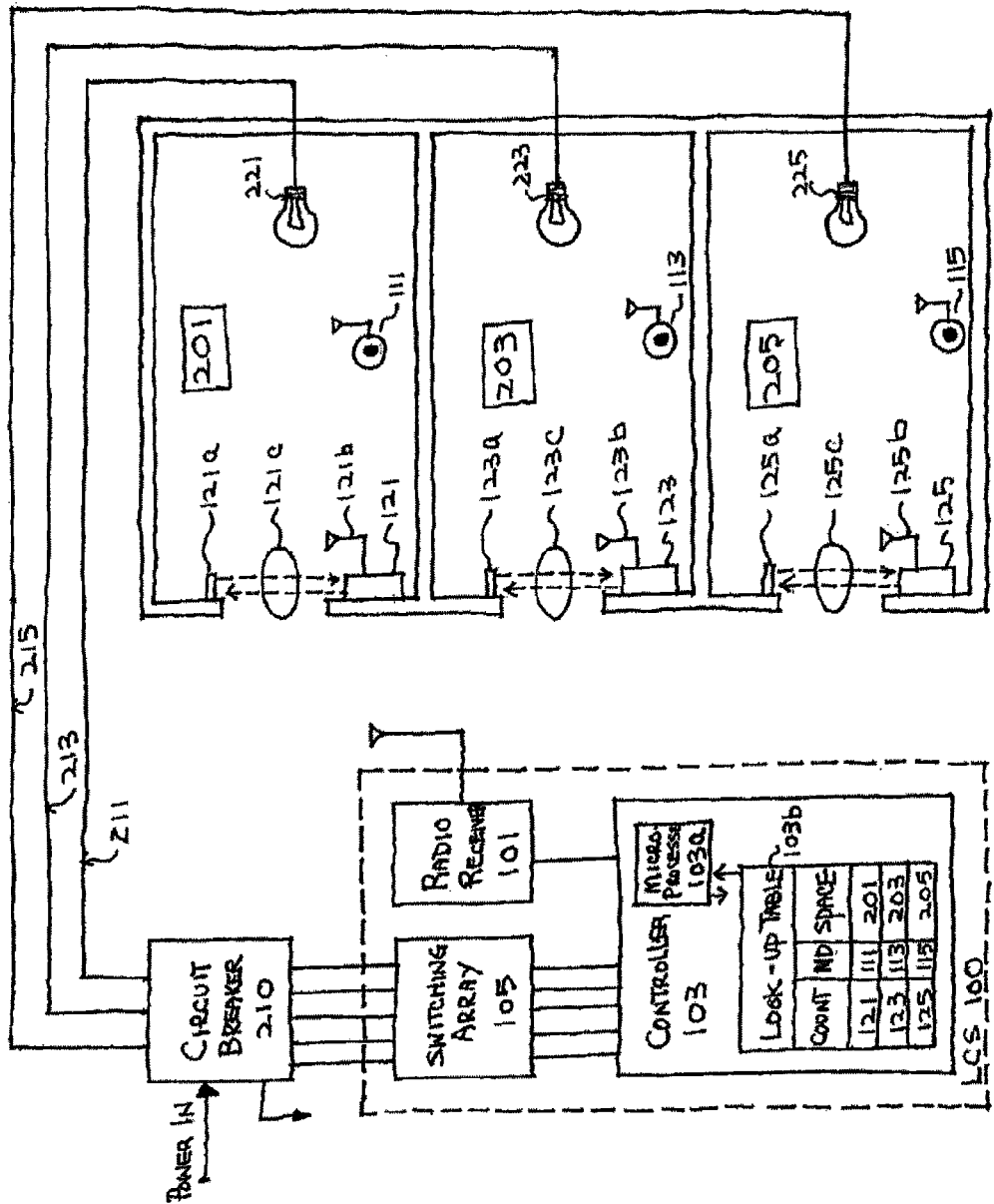
FIG. 1 depicts an electrical device control system, according to a non-limiting embodiment.

Turning now to FIG. 1 which depicts a system for controlling electrical devices, shown is an illustration of a first arrangement of a lighting control system 100 provided in accordance with aspects of an embodiment of the invention. For the sake of example only, the lighting control system 100 is described in combination with three rooms 201, 203 and 205. Those skilled in the art will appreciate that the number of rooms or spaces is not meant to limit the scope of the claims and that embodiments of the invention may be used in combination with any number of rooms and/or spaces inside or outside a building. Moreover, those skilled in the art will also appreciate that the lighting control system 100 may be supported by a combination of hardware, software and firmware, in addition to mechanical structures for securing elements of the lighting control system in place. And, only those elements required to describe specific aspects of the invention have been illustrated in FIG. 1.

The lighting control system 100 includes a controller 103, a radio receiver (or transceiver) 101 and switching circuit array 105. The switching circuit array 105 is connected to a circuit breaker 210. Those skilled in the art would appreciate that a circuit breaker is provided in a building for controlling electricity flow in a plurality of circuits, wherein each of the plurality of circuits is used for lighting in a corresponding plurality of spaces. In the specific example shown in FIG. 1, the circuit breaker 210 controls the electricity flow to circuits 211, 213 and 215 that correspond to rooms 201, 203, and 205, respectively. Tight bulbs 221, 223 and 225 draw electricity from the circuits 211, 213 and 215, respectively, so as to illuminate the corresponding rooms 201, 203 and 205. Those skilled in the art will appreciate that the bulbs 221, 223 and 225 have been provided for the sake of example only, and in no way limit the scope of the claims.

Additionally and/or alternatively, each room 201, 203, and 205 may contain a conventional light switch (not shown in FIG. 1) that may be used in combination with the lighting control system 100 in accordance with various options. For example, according to a first option, the operation of the conventional light switch may be overridden by operation of the lighting control system 100 and in particular the switching array 105 that is connected to the circuit breaker 210. That is, despite the on/off setting the conventional light switch, the lighting control system 100 has ultimate control over the lights within a room. In a second example option, the conventional light switch may serve to override the operation of the lighting control system 100, so that the user by way of the conventional light switch has ultimate control of the on/off setting of the lights in a room. In yet another option, the conventional light switch and lighting control system 100 may each operate independently without one being dominant over the other. In such an arrangement the on/off setting of the lights in a room at a given instance is dependent on which of the conventional light switch or the switching array 105 (of the lighting control system 100) was used to change the setting of the lights last. Additionally and or alternatively, a second arrangement for the use of the lighting control system 100 is described in further detail below with reference FIG. 3.

With continued reference to FIG. 1, the radio receiver 101 is provided for receiving and demodulating wireless signals to recover data modulated thereon, which is described in more detail below. The controller 103 includes a microprocessor 103*a* and a memory containing a look-up table 103*b*. The controller 103 is connected to the radio receiver 101 for accepting demodulated data, and to the switching circuit array 105 for providing control signals thereto.

The controller 103 also has a computer program product including computer usable program code for processing demodulated data from the radio receiver to produce control signals for the switching circuit. The computer usable program code including program instructions for: determining from which particular space the demodulated data corresponds to; determining whether the demodulated data is from a motion sensor or a counter in a particular space; if from a motion sensor, determining whether the motion sensor has detected motion in the particular space, and if motion has been detected one of maintaining electricity flow to the circuit corresponding to the particular space and turning on electricity flow to the particular space, and if motion has not been detected turning off electricity flow to the particular space; and if from a counter, determining whether the demodulated data from the counter indicates that the particular space is unoccupied or occupied, and if occupied one of maintaining electricity flow to the circuit corresponding the particular space and turning on electricity flow to the particular Row, and if unoccupied checking for demodulated data received from a corresponding motion sensor associated with the same particular space.

The lighting control system 100 also includes a combination of counters and motion sensors to provide information about the presence or absence of people in the room. Each room or space may be provided with one or more counters and/or one or more motion sensors. The counters and motion sensors are not hard-wired to the circuits regulated by a circuit breaker. Instead, each of the counters and motion sensors provided is equipped with a wireless radio transmitter (or transceiver) so that it may send information to the radio receiver 101. In the specific example shown in FIG. 1, room 201 includes a motion sensor 111 in the room and a counter 121 at the doorway to the room. Similarly, room 203 includes a motion sensor 113 in the room and a counter 123 at the doorway to the room. And similarly, room 205 includes a motion sensor 115 in the room and a counter 125 at the doorway to the room.

Each counter is 121, 123 and 125 is provided to count the number of entries and exits from the respective rooms 201, 203, 205. Each counter 121, 123 and 125 includes a respective radio transmitter 121*b*, 123*b* and 125*b* for transmitting data corresponding to the number of entries and exits from the space. Each counter 121, 123 and 125 also includes a respective reflector 121*a*, 123*a* and 125*a* so that corresponding beam 121*c*, 123*c* and 125*c* can be reflected back to the main counter units 121, 123 and 125, respectively.

In operation, the beams 121*c*, 123*c* and 125*c* are broken when a person enters or exits the corresponding rooms 201, 203 and 205. Such disturbances are detected by the corresponding counters 121, 123 and 125 and relayed back to the radio receiver 101 using the respective transmitters 121*b*, 123*b* and 125*b*. Motion sensors 111, 113 and 115 serve the purpose of determining if there is motion in the rooms 201, 203 and 205. If there is motion in a particular room or space, then the information is sent to the radio receiver 101. The radio receiver 101 demodulates data from the combination of counters and motion sensors and provides that demodulated data to the controller 103.

The controller 103 receives the demodulated data from the radio receiver to produce control signals for the switching circuit. To that end, the controller 103 includes computer usable program code as noted above. The computer usable program code includes program instructions for resolving which room contains people based on the information provided by the counters and motion sensors and the lookup table 103*b*.

Figure 2:
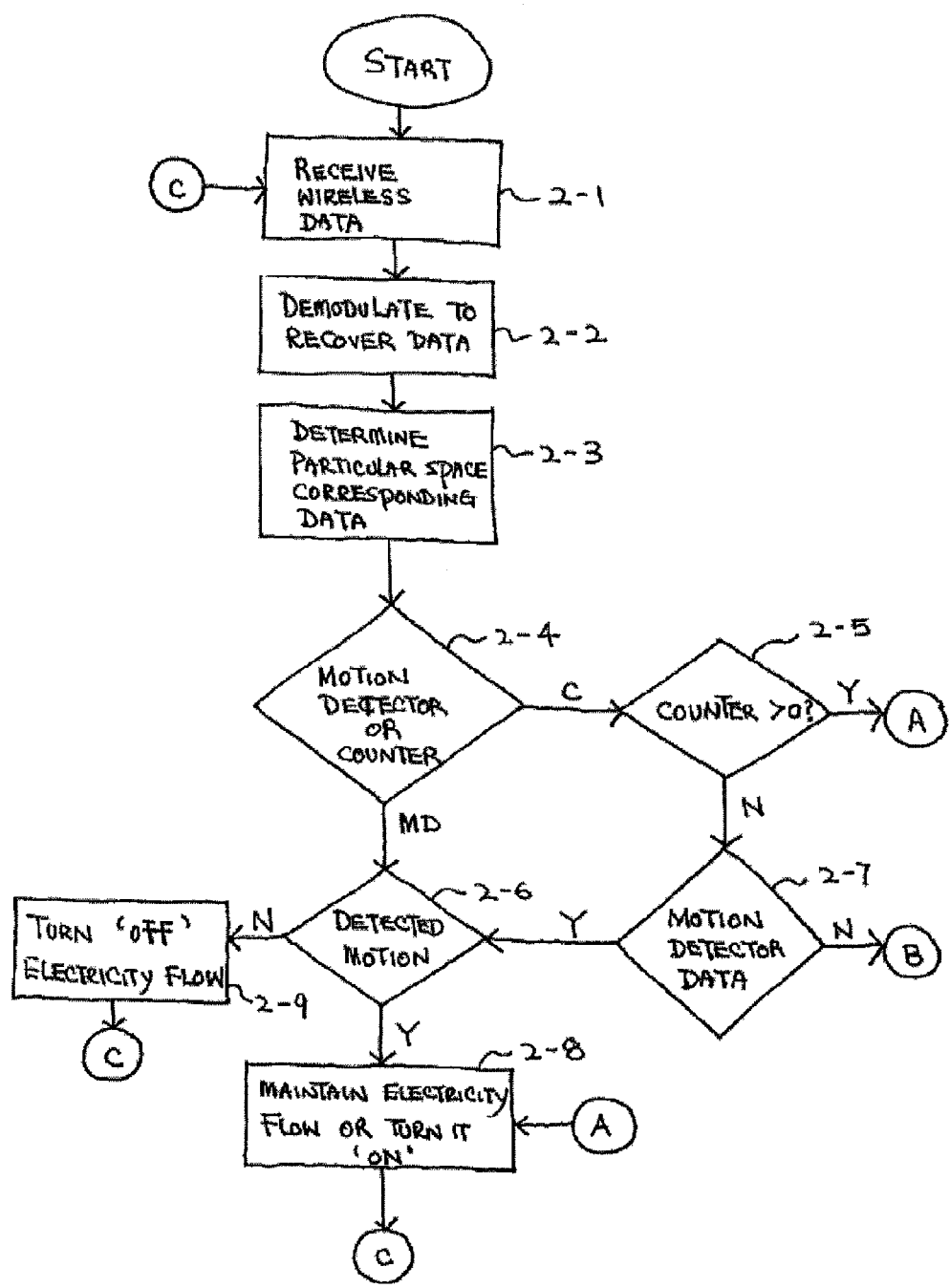
FIG. 2 depicts a method of controlling electrical devices, according to a non-limiting embodiment.

Turning to FIG. 2, shown is a flow chart illustrating the method steps for lighting control provided in accordance with aspects of an embodiment of the invention. The steps in FIG. 2 will be described with further reference to FIG. 1. Starting at step 2-1, the method includes receiving wireless data by the radio receiver (or transceiver) 101 of the lighting control system 100. At step 2-2, the wireless data is demodulated to recover the data modulated thereon. This may also be performed by the radio receiver (or transceiver) 101. Step 2-3 includes determining from which particular space the demodulated data corresponds to. For example, with reference to FIG. 1, the controller 103 connected to the radio receiver 101 accepts the demodulated data therefrom and processes the demodulated data to produce control signals for the switching circuit array 105 of which the controller 103 is also connected thereto. By having a microprocessor 103*a* and a memory containing look-up table 103*b*. The controller 103 is able to process the demodulated data and produce the control signals.

At step 2-4, the method includes determining whether the demodulated data is from a motion sensor 111 or a counter 121 in a particular space.

If from a motion sensor ("MD" path, step 2-4), the method moves onto step 2-6. At step 2-6, the method includes determining whether the motion sensor 111 has detected motion in the particular space. If motion has been detected (yes path, step 2-*a*), the method includes selecting one of maintaining electricity flow to the circuit corresponding to the particular space or turning on electricity flow to the particular space. If motion has not been detected (no path, step 2-9), the method includes turning off electricity flow to the particular space.

If from a counter ("C" path, step 2-4), the method moves onto step 2-5. At step 2-5, the method includes determining whether the demodulated data from the counter indicates that the particular space is unoccupied or occupied. If occupied (yes path, step 2-5), the method includes selecting one of maintaining electricity flow to the circuit corresponding to the particular space or turning on electricity flow to the particular space. If unoccupied (no path, step 2-5), the method moves onto step 2-7, which includes checking for demodulated data received from a corresponding motion sensor associated with the same particular space. If no demodulated data is received from a corresponding motion sensor, the case is over (no path, step 2-7), and the method ends. If demodulated data is received from a corresponding motion sensor, the case is not over (yes path, step 2-7) and the method loops back to step 2-6 where the motion sensors are again polled.

Figure 3:
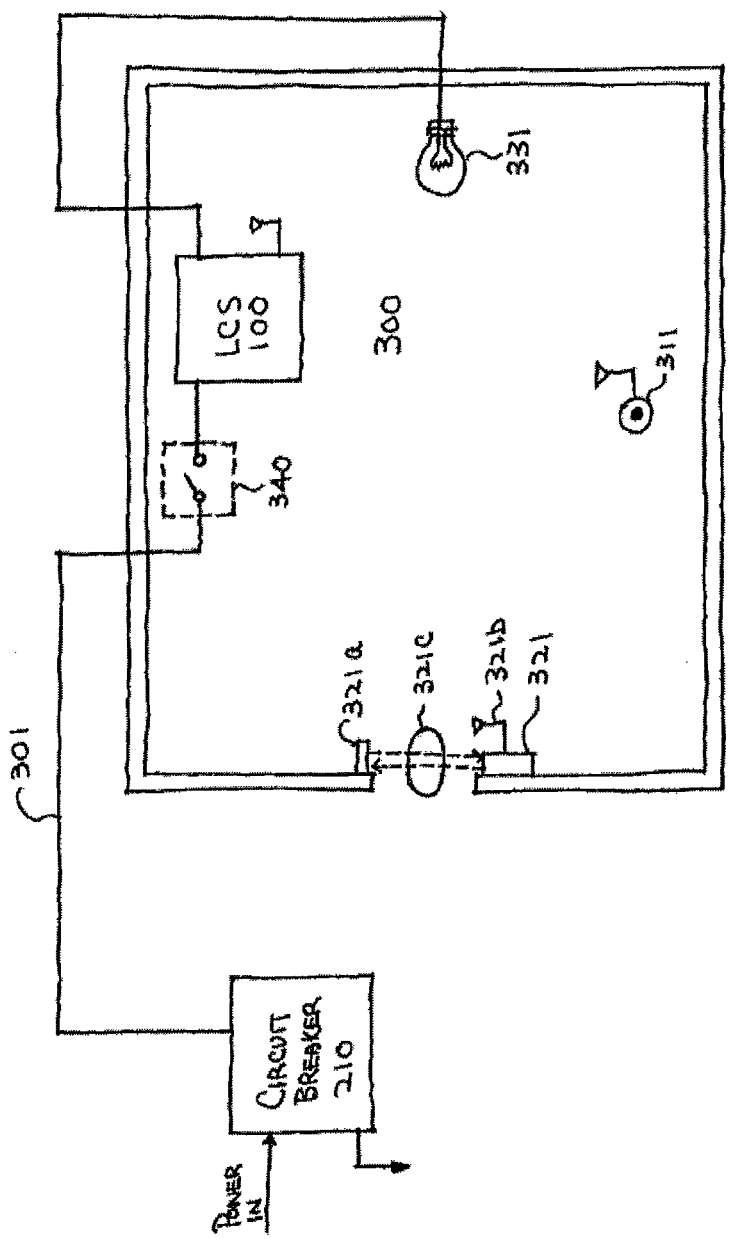
FIG. 3 depicts an electrical device control system, according to a non-limiting embodiment.

Turning to FIG. 3, shown is an illustration of a second arrangement of the lighting control system 100 (initially shown in FIG. 1) provided in accordance with aspects of an embodiment of the invention. For the sake of example only, the lighting control system 100 is described in combination a single room 300. Those skilled in the art will appreciate that the number of rooms or spaces is not meant to limit the scope of the claims and that embodiments of the invention may be used in combination with any number of rooms and/or spaces inside or outside a building. Moreover, those skilled in the art will also appreciate that the lighting control system 100 may be supported by a combination of hardware, software and firmware, in addition to mechanical structures for securing elements of the lighting control system in place. And, only those elements required to describe specific aspects of the invention have been illustrated in FIG. 1.

The room 300 includes a light bulb 331 connected to receive power from circuit 301 provided by the circuit breaker 210. A conventional light switch 340 and the lighting control system 100 are connected between the circuit break 210 and the light bulb 331 on the circuit 301. The switching circuit array 105 is connected to a circuit breaker 210.

Again, the bulb 331 has been provided for the sake of example only, and in no way is meant to limit the scope of the claims.

In one specific embodiment, the lighting control system 100 and the conventional light switch 340 can be integrated into a single unit, which is configured to operate in accordance with one or more of the options described above. That is, for example, according to a first option, the operation of the conventional light switch may be overridden by operation of the lighting control system 100 and in particular the switching array 105 that is connected to the circuit breaker 210. That is, despite the on/off setting the conventional light switch, the lighting control system 100 has ultimate control over the lights within a room. In a second example option, the convention light switch may serve to override the operation of the lighting control system 100, so that the user by way of the conventional light switch has ultimate control of the on/off setting of the lights in a room. In yet another option, the conventional light switch and lighting control system 100 may each operate independently without one being dominant over the other. In such an arrangement the on/off setting of the lights in a room at a given instance is dependent on which of the conventional light switch or the switching array 105 (of the lighting control system 100, shown in FIG. 1) was used to change the setting of the lights last.

Similar to above, the lighting control system 100 in FIG. 3 is configured to accept wireless signals from a doorway counter 321 and a motion detector 311. The counter 321 includes a respective radio transmitter 321b for transmitting data corresponding to the number of entries and exits from the room 300. Each counter 321 also includes a respective reflector 321a so that a corresponding beam 321c can be reflected back to the main counter unit 321.

In operation, the beam 321c is broken when a person enters or exits the rooms 300. Such disturbances are detected by the counter 321 relayed back to the lighting control system 100 using the respective transmitter 321b. The motion sensor 311 serves the purpose of determining if there is motion in the room 300, as was described above with reference to FIG. 1.

Figure 4:
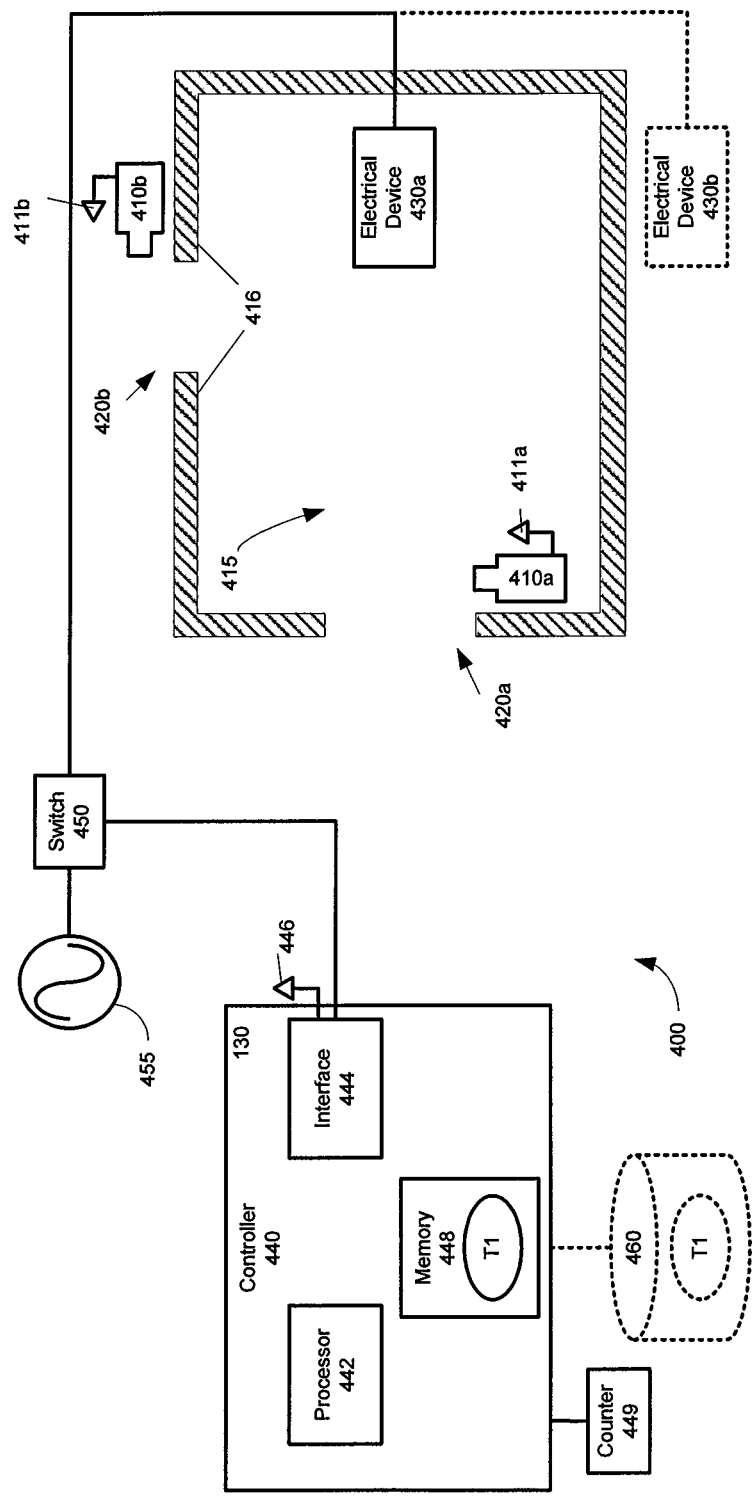
FIG. 4 depicts an electrical device control system, according to a non-limiting embodiment.
Figure 5:
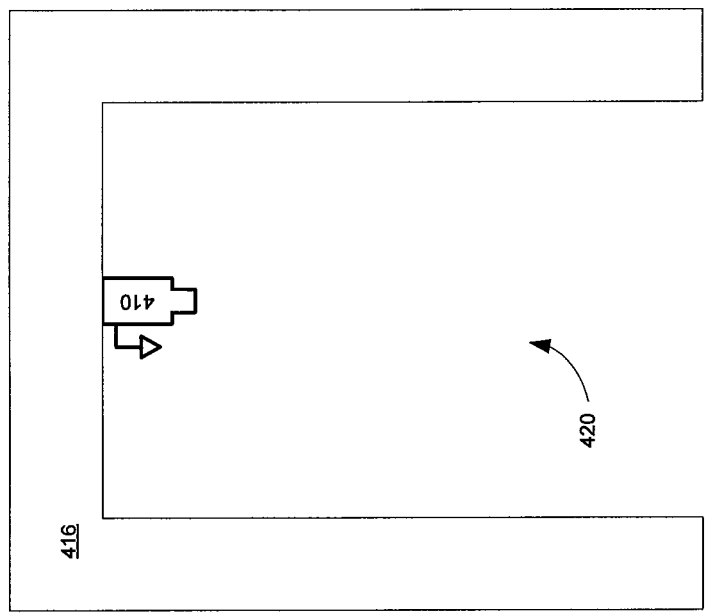
FIG. 5 depicts an camera mounted in an entrance, according to a non-limiting embodiment of the system depicted in FIG. 4.

Attention is now directed to FIG. 4 which depicts another non-limiting embodiment of a system 400 for controlling an electrical device. At least one camera 410 (for example cameras 410a and 410b, generically camera 410 and collectively cameras 410) for capturing images of entities entering or exiting a monitored area is mounted in a manner that allows the images to be captured. In a non-limiting example, one such monitored area comprises a room 415, defined by walls 416, the at least one camera mounted proximal to at least one entrance 420 to the monitored area. The depicted embodiment comprises two cameras 410a and 410b; each mounted next to an entrance 420a and an entrance 420b, respectively (generically entrance 420 and collectively entrances 420). However, the system 400 may comprise any suitable number of cameras for capturing images of entities entering or exiting a monitored area. In FIG. 4, the camera 410a is mounted inside the entrance 420a, while the camera 410b is mounted outside the entrance 420b, both cameras 410 pointing towards the entrance 420. However, the camera 410 may also be mounted in the entrance 420. In a particular non-limiting embodiments, as depicted in FIG. 5, the camera 410 may be mounted overhead the entrance 420, pointing down, inside or outside the monitored area. In another non-limiting embodiment (not depicted), the camera 410 may be incorporated into the frame of the entrance 420. However, the position of the camera 410 is not particularly limiting as long as the camera 410 is mounted in a manner that enables the camera 410 to capturing images of entities entering or exiting a monitored area. In other words, moving entities which are entering or exiting the monitored area pass through the field of view of the camera 410. In some embodiments, the captured images are compatible with reference images, described below.

In some embodiments, each camera 410 may be continually attempting to capture images of entities entering or exiting the monitored area, while in other embodiments the camera 410 may be enabled to capture images of entities entering or exiting the monitored area only when motion is detected near the entrance 420. For example, the camera 410 may further comprise a motion detector which triggers the camera 410 to capture images when motion is detected. In some embodiments, the camera 410 may further comprise a low-light lens, or low-light image processing elements and/or components, such that images may be captured in the dark (including but not limited to infrared image detectors).

The system 400 further comprises at least one electrical device 430 that an entity may prefer to be controlled when the entity enters or exits the monitored area (for example electrical devices 430a and 430b, generically the electrical device 430 and collectively electrical devices 430). In some embodiments, the electrical device 430a is located in the monitored area. Examples of the electrical device 430a include, but are not limited to, a lighting device or system, an entertainment device or system (e.g. stereo, television), a temperature control device (e.g. control device for heating ventilation and air conditioning systems (HVAC), such as a thermostat), and a device for controlling another device (e.g. a solenoid, or a stepper motor, such as for controlling window shades, or plumbing devices as in a bathroom etc.). In other embodiments, the electrical device 430b is located external to the monitored area. Examples of the electrical device 430b include, but are not limited to, a component of an HVAC system, the HVAC system comprising vents for controlling the temperature of the monitored area, a component of an entertainment system with output devices (e.g. speakers, display device etc.) associated with the monitored area for playing, and the like. Embodiments are not particularly limited, however, by the number of electrical devices 430 located in the monitored area or external to the monitored area.

Further, when the at least one electrical device 430 is controlled, in some embodiments, controlling may comprise either activating or deactivating the electrical device 430. For example, the entity may prefer that upon entering the monitored the area, the electrical device 430 be turned on (e.g. if the electrical device 430 comprises a lighting device or system, or an entertainment device or system), and that upon exiting the monitored area the electrical device 430 be turned off. Alternatively, the entity may prefer that upon entering or exiting the monitored area the electrical device 430 be controlled to a given state (for example a given volume of a sound system, a given song be played in the sound system, tuning to a given radio or TV channel, a given level of ambient light, a given air temperature etc.).

In yet further embodiments, controlling may comprise controlling a given feature of the electrical device 430. For example, the entity may prefer that a particular feature of the electrical device 430 be controlled upon entering or exiting the room (for example, turning on the radio of an entertainment system that comprises a plurality of features, such the radio, the television, a CD player, an MP3 player, a tape player etc.).

The system 400 further comprises a controller 440 for controlling electrical devices 430, the controller 440 in communication with a switch 450, the switch 450 for effecting control of the electrical device 430. In some embodiments, the switch 450 controls power (e.g. from a source of power 455, such as an AC powerline signal) to the electrical device 430, while in other embodiments, the switch 450 controls power to a feature of the electrical device 430. In some embodiments, the electrical device 430 may comprise the switch 450, for example see FIG. 8, discussed below. In these embodiments, the switch 450 may comprise a relay for controlling the electrical device 430 to a given state, or controlling a feature of the electrical device 430 to a given state. In these embodiments, the switch 450 may not be directly connected to the source of power 455.

In further embodiments, the switch 450 may affect control of a plurality of electrical devices 430 and/or features of electrical devices 430. Yet further embodiments may comprise a plurality of switches similar to the switch 450 (e.g. switches 450), each of the plurality of switches 450 for effecting control of one or more electrical devices 430 and/or one or more feature of the electrical devices 430. Indeed, embodiments are not particularly limited by the number of switches 450, or the number of electrical devices 430, or the number of features of the electrical devices 430, for which the switch 450 (or switches 450) affect control.

The switch 450 is in communication with the controller 440 in a wired or wireless manner, or a combination, as desired, using any suitable protocol or combination or protocols. For example, as depicted, the controller 440 is in communication with the switch 450 in a wired manner, and may communicate with the switch 450 via internet protocol (IP). Furthermore, the switch 450 may be wired directly to the controller 440, as depicted, or the switch 450 and the controller 440 may be communicating via a suitable communications network (not depicted), including but not limited to, the Internet, a LAN, a WAN, etc. In embodiments where the switch 450 is in communication with the controller 440 via a suitable wireless protocol, the suitable wireless protocol may include, but is not limited to WiFi, WiMax, a cellular communication protocol (e.g. GMS, CDMA etc.), etc.

Similarly, the controller 440 may be in communication with the camera 410 in a wired or wireless manner, or a combination, as desired. In the depicted embodiment each camera 410 comprises a radio 411, such as a wireless transceiver/receiver (e.g. the camera 410a comprises a radio 411a, the camera 410b comprises a radio 411b, etc., referred to generically as the radio 411 and collectively as radios 411), and the cameras 410 are in wireless communication with the controller 440 via any suitable wireless protocol, as described above, which may be the same or different from a wireless protocol being used for communication between the controller 440 and the switch 450. However, in other embodiments the cameras 410 may be in wired communication with the controller 440, either via a direct wired connection to the controller 440, or via a suitable communications network, similar to that described above.

Further, the controller 440 may be enabled to control electrical devices 430 in a plurality of monitored areas, each of the plurality of the monitored areas similar to the monitored area depicted in FIG. 4, and monitored via cameras similar to the cameras 410.

The controller 440 comprises a processor 442 for processing data, the processor 442 coupled to an interface 444 enabled for communication with both the switch 450 and the cameras 410, using any suitable protocol or combination of protocols as described above. In embodiments where wireless communication occurs with the switch 450 and/or the cameras 410, the interface 444 comprises a radio 446 for communicating with the switch 450 and/or the cameras 410 suing any suitable protocol or combination of protocols.

The cameras 430 are hence enabled to transmit images of entities entering or exiting the monitored area to the controller 440, and the interface 444 is correspondingly enabled to receive images from the cameras 430, and pass the images to the processor 442 for processing.

Further, in some embodiments, the controller 440 may comprise the switch 450, and the interface 444 comprises suitable connectors for connecting to the electrical device 430.

The system 400 further comprises a counter 449 in communication with the controller 440, for counting triggering shapes present in the monitored area, triggering shapes being described below. In some embodiments, the counter 449 is physically embodied in a counting apparatus, while in other embodiments the counter 449 is a logical entity. In yet further embodiments, the counter 449 is a combination of a counting apparatus and a logical entity. In some embodiments, the counter 449 is a standalone apparatus while in other embodiments, the controller 440 comprises the counter 449. In any event, the processor 442 is enabled to trigger control of the counter 449 to cause the counter 449 to increment if the number triggering shapes present in the monitored area increases, and to further cause the counter 449 to decrement if the number triggering shapes present in the monitored area decreases. Further, the processor 442 is able to determine the number triggering shapes present in the monitoring area at any given time by querying the counter 449. In embodiments where the controller 440 is controlling electrical devices 430 in a plurality of monitored areas, the system 400 may comprise a plurality of counters (similar to counter 449) at least one for each monitored area. Alternatively, the counter 449 may be enabled for uniquely counting triggering shapes present in each of the monitored areas The controller 440 further comprises a memory 448 for storing program code, and like, processable by the processor 442. In some embodiments, the memory 448 is further enabled for storing data associated with triggering shapes, as described below, for example in a Table T1. In other embodiments, the controller 440 is in further communication with a database 460 for storing data associated with triggering shapes, and the Table T1 may be stored at the database 460, rather than the memory 448. However, in some embodiments, some data associated with triggering shapes is stored in the memory 448, while other data associated with triggering shapes is stored in the database 460, as desired. In embodiments which comprise the database 460, the database 460 may be either local or remote to the controller 440, and the controller 440 may be in communication with the database 460 via a suitable communications network, for example via the interface 440.

Turning now to triggering shapes, it is understood that a triggering shape comprises a shape that, when recognized by the controller 440, causes the controller 440 to trigger control the electrical device 430. In some embodiments a triggering shape may comprise a shape of a human being. In some embodiments, a triggering shape may comprise a shape of a specific human being (e.g. certain members of a family or an office in embodiments where the monitored area comprises part of a residence or an office).

A triggering shape may be distinguished from a non-triggering shape. For example a non-triggering shape is any shape does not cause the controller 440 to trigger control of the electrical device 430, for example a pet, vacuum cleaner, a mobile robotic apparatus, and the like. In other words, there may be moving entities that enter or exit the monitored area that are not to trigger control of the electrical device 430. A family dog, for example, may roam a residence at will, and the family may prefer that the dog does not turn lights on or off etc.

The processor 442 is then enabled to process images received fro the cameras 410. Specifically, the processor 442 is enabled to process at least one image of at least one moving entity, received from the cameras 410, using at least one of a variety of image processing techniques, to determine if the at least one moving entity comprises at least one triggering shape. For example, the Image Processing Toolbox in Matlab, from The Mathworks, 3 Apple Hill Drive Natick, Mass. 01760-2098 USA, may be used to extract features from the at least one image corresponding to the at least one moving entity. Other image processing techniques (and/or other image processing software), however, may be used to determine if the at least one moving entity comprises at least one triggering shape and are within the scope of the present invention.

In some embodiments, the processor 442 is further enabled to process the at least one image and determine if the at least one moving entity comprises at least one triggering shape by comparing features of the at least one image to records in the Table T1. For example, the Table T1 may be pre-provisioned with general features of idealized triggering shapes. FIG. 7 depicts a non-limiting embodiment of the Table T1, in which general features of an idealized adult, a child and pregnant woman are stored as reference images in records, with one row representing one record. For example, each of the general features of the adult, the child and the pregnant woman are stored as a reference image comprising generic shapes of a shoulder portion 710, a head portion 720, and a nose portion 730 as if the adult, the child and the pregnant woman were viewed from above (as in the embodiment of the camera 410 depicted in FIG. 5). The image of the pregnant woman further comprises a pregnant belly portion 740. The image of the child is generally smaller than the image of the adult. The Table T1 of FIG. 7 further comprises an optional alpha-numeric description of each idealized triggering shape.

While the images stored in the Table T1 of FIG. 7 are reference images of idealized triggering shapes, embodiments of the Table T1 are not particularly limited by the number of records (i.e. rows) and other images of idealized triggering shapes stored in further records (i.e. rows) are within the scope of present embodiments. For example, other reference images of idealized triggering shapes may comprise an idealized thin adult, an obese adult, a toddler, a crawling baby, a person in a wheelchair, a patient lying on bed (e.g. a wheeled bed), a baby in a baby carriage, a toddler in a trolley, a person carrying objects that cover at least a part of his/her body, a person pushing a shopping cart etc.

Furthermore, the representation of the records in rows is not particularly limiting, and the records may be stored in any suitable manner compatible with the memory 448 and/or the database 460.

Additionally, while features of triggering shapes are represented by images in the Table T1 of FIG. 7, the images of triggering shapes may also be processed using a hash function, and the features may be stored as unique alpha-numerical values, as known to one of skill in the art.

In some embodiments, the Table T1 may also comprise a default "occupied" state of the electrical device 430 to which the electrical device 430 is to be controlled when the monitored area is occupied, and a default "unoccupied" state of the electrical device 430 to which the electrical device 430 is to be controlled when the monitored area is unoccupied. For example, if the electrical device 430 comprises a lighting device, the default occupied state of the lighting device may be "on", while the default unoccupied state of the lighting device may be "off".

While the images in the Table T1 of FIG. 7 represent features of idealized triggering shapes, further embodiments of the Table T1 may comprise features of triggering shapes that have been provisioned using a provisioning process implemented by a user of the system 400. For example, the controller 440 and/or the camera 410 may be placed in a provisioning mode to capture a reference image (or reference images) of the user entering and/or exiting the monitored area. The controller 440 may then be enabled to cause such a reference image (or reference images), including but limited to specific features of the reference image and/or a hash of the reference image, to be stored in the Table T1.

In some of these embodiments, the controller 440 may be in further communication with an output and/or an input device that enable the user to interact with the controller 440, the controller 440 enabled to control the output device to display a graphical user input (GUI) to effect such an interaction. Indeed, via the GUI and the input device (e.g. a mouse, a keyboard, and the like, or a combination), the user may provision a plurality of reference images, at least one image for each of a plurality of triggering shapes that may be expected to enter (or exit) the monitored area. For example a record of a reference image may be captured for each person who may be expected to enter (or exit) the monitored area (e.g. a record of a triggering shape for each member of a household, or each member of an office).

In some of these embodiments, each such reference image comprises enough information about a specific triggering shape to enable the controller 440 to identify whether subsequent images of moving entities comprise at least one triggering shape when comparing subsequent images and/or features of subsequent images with the Table T1. In these embodiments, the at least one moving entity may not be specifically identified during such a comparison. Rather, during processing of the at least one image, it may be generically determined if the at least one moving entity comprises at least one triggering shape: i.e. the at least one moving entity is generically identified as a member of a set of triggering shapes stored in the Table T1, without specifically identifying the at least one moving entity. In these embodiments, each record of the Table T1 may or may not comprise a description of each reference image. Further, as each at least one moving entity is not to be specifically identified, each reference image may comprise only the most basic information, such that use of resources of the memory 448 and/or the database 460 required to each records is generally reduced.

In some embodiments, each triggering shapes may be saved in association with the electrical device 430, or a specific given state of the electrical device 430, indicating that some triggering shapes cause the controller 440 to trigger control of some electrical devices 430, while other triggering shapes do not. For example, idealized triggering shapes of children may cause the controller 440 to turn on the lights in the monitored area and to further tune a television to a children's television station; however, an idealized triggering shape of an adult may cause the controller 440 to only turn on the lights in the monitored area. A distinction of preferences may be further based on the size of the triggering shape (e.g. a child is smaller than an adult).

In other embodiments, each such reference image comprises enough information about a specific triggering shape to enable the controller 440 to specifically identify the at least one moving entity when comparing subsequent images and/or features of subsequent images with the Table T1. Hence, not only is the at least one moving entity determined to comprise a triggering shape, but the specific at least one moving entity is identified during the comparison. In these embodiments, reference images may comprise more information than reference images in embodiments where only a generic determination is performed, as described above. Hence, while the reference images of triggering shapes in the embodiment of the Table T1 depicted in FIG. 7 comprise generic shapes of a shoulder, head and nose portion, in embodiments where specific identification of at least one moving entity is desired, the reference images may comprise more specific features. For example, the reference images may comprise information such as a specific size of a given body part (e.g. size of shoulders, size of head, size of nose, size of ears etc.), a specific shape of a given body part, a pattern on a body part (e.g. skin patterns, hair swirls, cowlicks etc.), facial features, hairstyles (or a plurality of hairstyles), specific clothes, specific jewelry, length of stride, length of arm swing, and the like.

In some of these embodiments, each reference image may be stored in association with preferences of a specific user associated with the reference image. The preferences may be further stored in the Table T1 during the provisioning process, or may be updated at any given time via the GUI. Examples of preferences that may be stored in association with a reference image include, but are not limited to, a list of electrical devices 430 which are to be activated (or deactivated) when the specific user enters the monitored area, a list of electrical devices 430 which are to be deactivated (or activated) when the specific user exits the monitored area, a list of features of electrical devices 430 that are to be activated (or deactivated) when the specific user enters the monitored area, and/or a list of features of electrical devices 430 which are to be deactivated (or activated) when the specific user exits the monitored area. For example, a preference may comprise a preferred lighting scheme (e.g. certain lights on, certain lights off, certain lights set to a given level), a preferred HVAC scheme (e.g. the monitored area set to a given temperature), preferred music, a preferred radio station, preferred volume of an entertainment system, a preferred setting of window blinds controlled by a stepper motor(s), a solenoid(s) and the like, or a preferred level and temperature of a bath (or temperature of a shower) in embodiments that comprise plumbing fixtures controlled by a stepper motor(s), a solenoid(s) and the like.

Further, preferences can be as granular as desired. For example, preferences can be stored for given times of day, given times of year (e.g. summer, fall, winter and spring preferences), for given external (i.e. outdoor) temperatures and temperature ranges (assuming the controller 440 is in communication with an outdoor temperature detector), for weekdays, for weekends, and the like. Moreover, in some embodiments, the controller 440 may be enabled to determine what a moving entity is wearing, with preferences stored in association with what a specific user may be wearing (e.g. a preference for cooler temperatures may be stored in the Table T1, if the specific user is wearing a sweater).

Additionally, in embodiments where the controller 440 is enabled to monitor a plurality of monitored areas, preferences may be stored for each monitored area. However, in some of these embodiments, general preferences may be assumed to apply for each of the plurality of monitored areas. For example a specific user may prefer that each monitored area that is being entered be adjusted to a similar lighting level and/or a similar temperature.

In some embodiments, the Table T1 may further comprise at least one record of a non-triggering shape, for example a reference image of a pet, a vacuum cleaner, a mobile robotic apparatus etc. Records of non-triggering shapes may assist the controller 440 in determining if electrical device 430 is to be controlled: i.e. if the moving entity comprises a non-triggering shape, the controller 440 understands that the at least one electrical device 430 is not to be controlled.

Attention is now directed to FIG. 6, which depicts a method 600 of controlling an electrical device. The method 600 will be described with reference to the system 400, for illustration purposes only, however it is understood that the method 600 may be implemented in any suitable system. Furthermore, while the method 600 is described with reference to implementation within the controller 440, the method 600 may be implemented within any apparatus suitable for controlling an electrical device.

At step 610, at least one image of at least one moving entity is received at the controller 440 from at least one camera 410. Images may be received from the camera 410a, the camera 410b, or any other camera for capturing images of entities entering or exiting the monitored area (i.e. the at least one moving entity passes through the field of view of the camera 410). Any suitable number of images may be received for making the determinations described below. Furthermore, the cameras 410 may be continually transmitting images, some of which comprise moving entities and others which do not comprise moving images, for example in a continuous video feed from each camera to the controller 440. In these embodiments, the controller 440 is enabled to process the video feed and determine which images comprise moving entities. In other embodiments, the cameras 410 may be enabled to transmit images only when the images comprise moving entities, for example via a motion detector (described above), or via image processing software resident on the cameras 410. In any event, the controller 440 receives at least one image of at least one moving entity for processing by the processor 442.

At step 620, the at least one image is processed to determine if the at least one moving entity comprises at least one triggering shape. The determination may be made by processing the at least one image and comparing the at least one image to the Table T1. In some embodiments, features of the at least one moving entity may be extracted during processing, and the features compared to the Table T1. The specific portion of the image which comprises the at least one moving entity may be extracted by comparing the at least one image with a reference image of the field of view of the camera 410 that does not comprise the at least one moving entity (i.e. the at least one moving entity be extracted by subtracting the reference image of the field of view of the camera 410 from the at least one image). In some of these embodiments, a specific given user may be identified via the association of a triggering shape with a specific given user stored in the Table T1, in embodiments where the reference images in the Table T1 comprises enough information about a specific triggering shape to enable the controller 440 to specifically identify the at least one moving entity.

If, at step 620, the at least one moving entity does not comprise a triggering shape, the controller 440 continues to receive (or wait for) images at step 610. It may be determined that the at least one moving entity does not comprise a triggering shape, either by determining that the at least one moving entity comprises a non-triggering shape (in embodiments where the Table T1 comprises a record of non-triggering shapes) or by determining that the at least one moving entity does not comprise any of the triggering shapes stored in the Table T1. In some embodiments, the determination of whether the at least one moving entity comprises a triggering shape may be indeterminate. In some of these embodiments, the controller 440 continues to receive (or wait for) images at step 610, while in other embodiments the controller 440 may proceed to an optional step 625 or a step 630 described below. In other words, in some embodiments, it is assumed that an indeterminate moving entity does not comprise a triggering shape, while in other embodiments it is assumed that an indeterminate moving entity does comprises a triggering shape. The specific implementation may be determined by a user of the system 400 interacting with the GUI, described above.

If, however, it is determined at step 620 that the at least one moving entity comprises at least one triggering shape, the method proceeds to either an optional step 625, or step 630. In some embodiments, the at least one moving entity may comprise a plurality of triggering shapes (i.e. the at least one moving entity comprises a plurality of moving entities). For example, a number of people may enter or exit the monitored area concurrently (e.g. side by side, or a first person immediately followed by a second person, such that both the first person and the second person are captured in the at least one image received at step 610). In a further example, one person may be carrying another person (e.g. a parent carrying a child, newlyweds etc.) as they enter or exit the monitored area. If so, at step 625, the number of triggering shapes is determined by processing the at least one image to extract the number of triggering shapes. For example, the at least one image may be compared to combinations of triggering shapes from the Table T1. In some embodiments, the Table T1 may also store most likely combination of triggering shapes (e.g. parent carrying child), with the at least image being compared first to the most likely combinations. In some embodiments, the step 625 is performed generally concurrent with step 620, for example during the processing for determining if the at least one moving entity comprises at least one triggering shape.

At step 630 it is determined if the at least one moving entity is entering or exiting the monitored area. For example, a direction of travel of the moving entity may be determined by processing the at least one image received at step 610. In some embodiments, a direction of travel may be determined by comparing a first image with a second image, the second image captured after the first image. Hence, a position of the at least one moving entity in the first image may be compared to a position of the at least one moving entity in the second image to determine a direction of travel. In other embodiments, a shutter speed (or an effective shutter speed) of the camera 410 may be such that the at least one moving entity appears slightly smeared in the at least one image, with a blurred area appearing behind the at least one moving entity. Hence a direction of travel may be determined by determining the position of the blurred area.

In some embodiments, it may be indeterminate as to whether the at least one moving entity is entering or exiting the monitored area. For example, at least one moving entity may enter the doorway, hover momentarily, change their mind and exit the doorway, only to immediately turn around and exit the doorway. In some of these embodiments, it may be difficult to determine if the at least one moving entity is entering or exiting the monitored area. In some of these embodiments, in the event of whether the at least one moving entity is entering or exiting a room is indeterminate, it is assumed that the entity is entering the monitored area, while in other embodiments it is assumed that the moving entity is exiting the monitored area. In other words, it is at least determined that the at least one moving entity is at least one of entering and exiting the monitored area, and the controller 440 is enabled to respond accordingly. However, the specific implementation may be determined by a user of the system 400 interacting with the GUI, described above.

Once a direction of travel is determined, whether the at least one moving entity is entering or exiting the monitored area may be determined either through a priori knowledge of the position and orientation of the camera relative to the entrance 420, or by comparing the direction of travel to a reference direction. In the latter embodiments, the Table T1 may further comprise reference directional data for each entrance 420, for example a reference directional image for each entrance 420 along with associated information describing the orientation of the reference directional image (i.e. such that the at least one image, and the direction of travel of the at least one moving entity, may be compared with the orientation of the reference image to determine the orientation of the direction of travel relative to the monitored area). In some embodiments, the reference directional image may comprise the reference image of the field of view of the camera 410 that does not comprise the at least one moving entity, described above.

Embodiments where the at least one entity is determined to be entering the monitored area, at step 640, are first considered. In these embodiments, the counter 449 is triggered to increment by the number of moving entities which are entering the monitored area. At an optional step 650, it is determined if the electrical device 430 is already in a given state, for example the default occupied state of the monitored area, or a preferred state defined by preference stored in the Table T1. If the electrical device 430 is already in the given state, the controller 440 continues to receive (or wait for) images at step 610. If however, the controller 440 is not in the given state, the controller 440 triggers control of the electrical device 430 at step 660. For example, the controller 440 may trigger the switch 450 to control the electrical device 430 to the given state by transmitting a control signal to the switch 450 via the interface 444.

The given state may be determined by consulting the Table T1 to determine either the default occupied state of the electrical device 430, or a preference of the specific user associated with the triggering shape, the preference defining the given state to which the electrical device 430 should be controlled if the specific user enters the monitored area, as described above. In embodiments where more than one specific user may be entering (or already present) in the monitored area, the preferences of each specific user may be in conflict. In other words, one specific user may prefer a first given when they are present in the monitored area, while another specific user may prefer a second given state different from the first given state when they are present in the monitored area. In some of these embodiments, the controller 440 may trigger control of the electrical device 430 to a state intermediate the first given state and the second given state (for example an average or a mean of the given states). In alternative embodiments, the Table T1 may further comprise a priority of a preference stored in association with each specific user. In these embodiments, the controller 440 may trigger control of the electrical device 430 to the state having the highest priority. Alternatively, the controller 440 may trigger control of the electrical device 430 to a state based on a weighting of the preferred states, the weightings based on the priority of each state.

Furthermore, in some embodiments, the controller 440 may maintain a list of entities (e.g. given users) which are present in the monitored area.

In embodiments where it is determined that the at least one moving entity comprises a triggering shape, but the at least one moving entity cannot be specifically identified (i.e. a visitor to a home is entering the monitored area), the controller 440 triggers control of the electrical device 430 to the default occupied state.

After the controller 440 triggers control of the electrical device 430 to the given state, the controller 440 continues to receive at least one image (or waits to receive at least one image) at step 610.

Turning now to embodiments where the at least one moving entity is determined to be exiting the monitored area, at step 640, the counter 449 is triggered to decrement by the number of moving entities which are exiting the monitored area.

At step 680 it is determined if the number of entities present in the monitored area is less than a threshold number by comparing the total of the counter 449 with the threshold number. For example, in some embodiments, the threshold number may be "1", and hence if the number entities present is less than the threshold number, the room is unoccupied. However, in other embodiments, the threshold number may be greater than 1. In these embodiments, there may be a default state of the electrical device 430 if there are fewer than a minimum number of persons in the monitored area, for example to conserve energy.

In some embodiments, if the number of entities present in the monitored area is not less than the threshold number, then the controller 440 continues to receive at least one image (or waits to receive at least one image) at step 610. However, in embodiments where the number of entities present in the monitored area is less than the threshold number (e.g. the room is unoccupied), then at step 690 the controller 440 triggers control of the electrical device 430 to a state different from a present state. For example, if the monitored area is unoccupied, the controller 440 may trigger control of the electrical device 430 to the default unoccupied state. In embodiments where the threshold number is greater than 1, the controller 440 may trigger control of the electrical device 430 to the default state of the electrical device 430 where there are less than a minimum number of persons in the monitored area. This default state may also be stored in the Table T1.

In embodiments that comprise the list of entities which are present in the monitored area, the list may be updated based on the determination of which specific given users have exited the monitored area.

After the controller 440 triggers control of the electrical device 430 at step 690, the controller 440 continues to receive at least one image (or waits to receive at least one image) at step 610.

In an alternative embodiment of the branch of the method 600 where the at least one moving entity is determined to be exiting the monitored area (i.e. steps 670 through to 690), if it is determined that the monitored area remains occupied after the at least one moving entity exits the monitored area (i.e. the counter 449 is at a non-zero number), the controller 440 may trigger control of the electrical device 430 to a state based on the given users who remain in the monitored area. The given users remaining in the monitored area may be determined by consulting the list of entities present in the monitored area. For example, if a given user exits the monitored area, the controller 440 may trigger control of the electrical device 430 to a state based on the given users remaining in the monitored area. For example, if the given user exiting the monitored area is a user whose preferences have been given a high priority in the Table T1, the controller 440 may trigger control of the electrical device 430 to a state based on the priority of the preferences of the given users remaining in the monitored area, similar to that described above.

In some embodiments, a delay may be introduced between determining if the at least one moving entity is entering or exiting the monitoring area and triggering control of the electrical device 430. For example, if the at least one moving entity occupies the monitored area for only a short period of time (or leaves the monitored area for a short period of time), triggering control of the electrical device 430 may be immediately undesirable. Hence, the delay allows the controller 440 to determine if the at least one entity will remain in the monitored area (or remain out of the monitored area) by continuing to process images received at step 610.

Attention is now to FIG. 8, which depicts a non-limiting embodiment of a system 800 for controlling an electrical device. FIG. 8 is substantially to FIG. 4, with like elements depicted with like numbers. However in this embodiment, the electrical device 430a comprises a switch 850a similar to the switch 450, and the electrical device 430b comprises a switch 850b, similar to the switch 450. Each of the switch 450a and the switch 450b (collectively switches 850 and generically the switch 850) comprise a radio 811a and a radio 811b (collectively radios 811 and generically the radio 811), similar to the radios 411a and the radios 411b, for communicating with the controller 440. Hence, in these embodiments, the controller 440 is in communication with the electrical devices 440 via the radios 811, and control signals for triggering control of the electrical devices 430 may be transmitted to the radios 811. Hence, this embodiment, communication between the controller 440, the cameras 410 and the switches 850 occur via wireless signals.

In some of these embodiments, the switch 850 is further enabled to monitor the state of the electrical device 430, and the controller 440 is enabled to receive a state of the electrical device 430 from the switch 850, via the radio 811. In these embodiments, therefore, the controller 440 may be enabled to determine if the state of the electrical device 440 is adjusted by a user, for example after the controller 440 triggers control of the electrical device 430 to a given state within the method 600, described above. Further, the controller 440 may be enabled to determine if the state of the electrical device 440 is adjusted by a user within a given time period, after the controller 440 triggers control of the electrical device 430 to a given state. In these embodiments, the preferences of the user may have changed, but the user may not have updated their preferences in the Table T1. Hence the user may be adjusting the state of the electrical device 430 each time the user enters the monitored area to reflect the change (or changes) in preference.

In these embodiments, the switch 850 may then be enabled to transmit the state of the electrical device 430 periodically or, alternatively, when the state of the electrical device 430 is adjusted by a user. Hence, in embodiments where the controller 440 is enabled to identify a specific given user, for example at step 620 in the method 600, the controller 440 may be further enabled to associate adjustments to the state of the electrical device 430 with a specific given user. In some embodiments, the controller 440 may be further enabled to request the state of the electrical device 440 from the switch 850 (for example, periodically, or after a given time period following triggering control of the electrical device 430).

In other embodiments, each electrical device 430 may comprise a separate device for detecting the state of the electrical device 430, and further transmitting the state of the electrical device 430 to the controller 440 (e.g. in the system 400).

In some of these embodiments, the controller 440 may cause the adjustments to the state of the electrical device 430 to be stored in association with a specific given user in a record of adjustments of a suitable format, for example at the database 460 or in the memory 448. In some of these embodiments, the adjustments may be stored in association with a time and/or date stamp (this presumes the controller 440 has access to a clock). In these embodiments, a user may then later view the record of adjustments (e.g. via the GUI described above, or another suitable GUI) to determine what adjustments he/she made to the state of the electrical device 430. The user may then use the record of adjustments to make changes to his/her preferences in the Table T1. For example, the user may not strictly be aware that their preferences have changed, but upon viewing the record of adjustments, may become aware that their preferences have changed and in response manually adjust his/her preferences in the table T1.

However, in other embodiments, the controller 440 may be enabled to change the preferences of the user in the Table T1, responsive to the user adjusting the state of the electrical device 430 when they enter the monitored area. In some of these embodiments, the controller 440 may change the preference of the user to the adjusted state of the electrical device 430. In some of these embodiments, the controller 440 may change the preference of the user only if the state of the electrical device 430 is adjusted within a given time period after the user enters the monitored area.

In other embodiments, the controller 440 may change the preference of the user only if the record of adjustment indicates that the user has changed the state of the electrical device 430 a given number of times, "X", during unique enter events (i.e. the controller 440 determines that the user has adjusted the state of the electrical device 430 the last "X" times that the user has entered the monitored area). In yet further embodiments, the controller 440 may change the preference of the user based on an average of the last "X" times that the state of the electrical device 430 was adjusted. In this manner, the controller 440 may determine the preferences of the user, based on the behaviour of the user.

Further, if preference of the user is not initially stored in the table T1, the controller 440 may be enabled to detect a first entrance to the monitored area by the user, and subsequently store preferences of the user in the Table T1 based on adjustments the user makes to the state to the electrical device 430. For example, the user may be a new user, and the at least one image of the user (i.e. a moving entity) as the user enters the monitored area for the first time, may be stored in the Table T1 after the at least one image of the user is determined to comprise a triggering shape (i.e. an idealized triggering shape). In other words, the first image of the user that is acquired by the controller 440 is saved in the Table T1 as a triggering shape specifically associated with the user. Hence the controller 440 may be enabled to recognize the user in subsequent entrances (or exits) by comparing subsequent images of the user with the first image of the user.

Upon the first entrance of the user, the controller 440 triggers control of the electrical state 430 to the default occupied state. However, if the user adjusts the state of the electrical device 430, the controller 440 may then save the adjusted state of the electrical device 430 as a preference of the user.

In some embodiments, the system 400 and/or the system 800 further comprises a remote control apparatus (not depicted) for controlling the associated system. The remote control apparatus may be in communication with the controller via a radio, similar to radios described above. The remote control apparatus is enabled to allow a user to turn the associated system on or off, or to (e.g. temporarily) bypass the system. In some embodiments, the remote control apparatus may be further enabled to allow a user to enter the number of people who are already in a monitored area, in the event that the system is turned on when the monitored area is already occupied, or an error in counting triggering shapes occurs. In other embodiments, the remote control apparatus may comprise a reset button in the event that an error in counting triggering shapes occurs. In some embodiments, the remote control apparatus may further comprise a display device for displaying the number of triggering shapes present in a monitored area, as determined at the controller 440, as described above. For example, the controller 440 may transmit a control signal to the remote control apparatus, which instructs the remote control apparatus to display the total number of trigger shapes in the monitored area, as determined by the controller 440. This may assist a user in determining if an error has occurred.

Attention is now directed to FIG. 9, which depicts another non-limiting embodiment of a system 900 for controlling an electrical device. The system 900 is substantially similar to the system 800, with like elements depicted with like numbers. However, in system 900, a monitored area comprises a parking garage 915, and the cameras 410 are proximal an entrance 920*a* and an exit 920*b*, in a manner that enable the cameras 410 to capture images of vehicles entering and exiting the parking garage 915 (e.g. overhead, as in FIG. 5). The electrical device comprises a display device 930 for displaying the number of parking space available within the parking garage 915, for example via an information display (ID) component 935 of the display device 930 (for example, any suitable component for displaying data to a driver of a vehicle, including but not limited to an LED display component, a CRT, a flat panel display, an electromechanical counter, etc.). In some embodiments, the display device 930 comprises a switch 950, the switch 950 being generally similar to the switch 850, which is in communication with the controller 440 via a radio 911 (similar to the radio 811). However, in these embodiments, the switch 950 is enabled to control the ID component 935, for example to cause the ID component 935 to display the number of parking spaces available in the parking garage 915 (e.g. "356 Spaces Available").

In some embodiments, the display device 930 may comprise a second ID component, similar to the ID component 935, on a side opposite the ID component 935, such that the number of parking spaces available in the parking garage 915 is displayed on both sides of the display device 930. Further, the display device 930, the cameras 410, the radio 411 etc., will be powered by a power source, such as powerlines etc. (i.e. the electrical wiring in the parking garage 915). In some embodiments, the display device 930, the cameras 410, the radio 411 etc. may be further equipped with batteries in the event of a power shortage. In some embodiments, the displays device 930 and/or the cameras 410 may be further provided with a light powered by the battery to provide additional lighting in the parking garage 915 in the event of a power failure, hence enabling the camera 410 to continue capturing images in embodiments where the camera 410 is not enabled to capture images in the dark.

In these embodiments, a triggering shape comprises the shape of a vehicle that may park in the parking garage 915. FIG. 10 depicts a non-limiting embodiment of the Table T1 specific to the system 900, in which general features of vehicles are stored as reference images in records, with one row representing one record. For example, general features of an automobile, a truck, a minivan and a motorcycle (all in overhead view), are stored in the Table T1, as depicted. However, general features of other types of vehicles which may park in the parking garage 915 are within the scope of present embodiments, for example trailers, tow trucks, vehicles with trailers, motorcycles with sidecars etc. In some embodiments, the general features of vehicles may further comprise the general features of a driver; for example, to aid in the identification of a motorcycle, the general features of a motorcycle with a driver astride the motor cycle may be stored in the Table T1. The Table T1 of FIG. 10 further comprises an optional alpha-numeric description of each idealized triggering shape.

In some embodiments, the Table T1 may further comprise at least one record of a non-triggering shape, which in these embodiments may comprise human beings, pets, baby trolleys, cleaning carts, wheeled garbage bins, luggage carts, furniture etc. (i.e. any moving entity that would not normally occupy a parking space). Records of non-triggering shapes may assist the controller 440 in determining if the display device 930 is to be controlled: i.e. if the moving entity comprises a non-triggering shape, the controller 440 understands that the display device 930 is not to be controlled.

Hence, in operation, each camera 410 captures images of vehicles entering and exiting the parking garage 915 and transmits the images to the controller 440. The controller 440 processes the images to determine if the images comprise at least one triggering shape, as described above (i.e. to determine if at least one vehicle entering or exiting the parking garage 915). If so, the controller 440 triggers control of the display device 930 at by transmitting a control signal to the switch 850 via the interface 444. In these embodiments, the switch 950 then causes the ID component 935 to display the number of parking spaces available in the parking garage 915. Hence, a driver of a vehicle will understand if it is worth entering the parking garage 915 to park the vehicle. Further, the counter 449 effectively counts the total number of vehicles present in the parking garage 915 (e.g. the number of vehicles which have entered the parking garage 915 minus the number of vehicles which have exited the parking garage 915).

Further, in some embodiments, the vehicle may be towing another vehicle or trailer (e.g. a tow truck etc.). In these embodiments, the controller 440 is further enabled to distinguish if the vehicle being towed is also a triggering shape (i.e. whether or not it is likely to occupy a parking space), and count it accordingly. In some embodiments, for example, a tow truck may enter a building and leave with a vehicle. In these embodiments, the tow truck may or may not park, and hence may or may not be counted in the total number of vehicles present in the building. For example, if a company managing a parking garage uses a particular towing company, the controller 440 may be enabled to identify tow trucks from that towing company. Hence, when the tow truck arrives to tow a vehicle, the tow truck is not counted as triggering shape as it is assumed that the tow truck will not park. In other embodiments, a vehicle may enter the parking garage 915 with a trailer and leave the trailer in the parking garage 915. Hence, both the vehicle and the trailer are counted as triggering shapes, and the controller 440 determines that the trailer is occupying a parking space when the vehicle exits.

In some embodiments, the determination of whether a vehicle is entering or exiting the parking garage 915 may be performed by processing images, as described above. In other embodiments, the determination of whether a vehicle is entering or exiting the parking garage 915 may be performed by correlating images with the cameras 410. For example, as camera 410*a* is mounted over the entrance 920*a*, images received from the camera 410*a* (that comprise triggering shapes) are understood to be images of vehicles entering the parking garage 915. Similarly, as camera 410*b* is mounted over the exit 920*b*, images received from the camera 410*b* (that comprise triggering shapes) are understood to be images of vehicles exiting the parking garage 915.

In some embodiments, the ID component 935 is initially set to display the total number of parking spaces in the parking garage 915 (assuming the parking garage 915 is empty), and the switch 950 causes the number displayed on the ID component 935 to decrement or increment based on whether a vehicle is entering or exiting the parking garage 915, respectively. In these embodiments, the control signal transmitted to the switch 950 is indicative of whether a vehicle is entering or exiting the parking garage 915. In some of these embodiments, the display device 930 may further comprise the counter 448 (e.g. in some embodiments the ID component 935 comprises the counter 449), however in these embodiments, the counter 449 is not counting the total number of vehicles present in the parking garage 915, but the total number of parking spaces available in the parking garage 915.

In other embodiments, the total number of parking spaces in the parking garage 915 may be available to the controller 440 (for example, stored in the memory 448 or the database 460), and the processor 442 may determine the number of parking spaces available in the parking garage 915 by subtracting the total number of vehicles present in the parking garage from the total number of parking spaces in the parking garage 915. In these embodiments, the control signal transmitted to the switch 950 may comprise the number of parking spaces available in the parking garage 915, and the switch 950 may be enabled to process the control signal to extract the number of parking spaces available in the parking garage 915, and cause the ID component 935 to display the number of parking spaces available.

In other embodiments, the total number of parking spaces in the parking garage 915 may be available to the switch 950, and the controller 440 transmits the total number of vehicles present in the parking garage 915. The switch 950 is enabled to determine the number of parking spaces available in the parking garage 915 by subtracting the total number of vehicles present in the parking garage from the total number of parking spaces in the parking garage 915, as above, and cause the ID component 935 to display the number of parking spaces available.

If the total number of vehicles in the parking garage is equal to the total number of parking spaces in the parking garage 915, than the display device 930 will indicate that there are "0" spaces available. If the total number of vehicles in the parking garage is greater than the total number of parking spaces in the parking garage 915, than the display device 930 will continue to indicate that there are "0" spaces available.

In some embodiments, the controller 440 may be further enabled to determine the type of vehicle entering or exiting the parking garage 915, by comparing images with the Table T1 in FIG. 10. The counter 449 may be enabled to count not only the total number of vehicles present in the parking garage 915, but also the number of each type of vehicle present in parking garage 915. In these embodiments, the parking garage 915 may have some parking spaces that are suitable for one type of vehicle, but not for another type of vehicle. For example, the parking garage 915 may have parking spaces specifically for motorcycles, and parking spaces specifically for trucks and/or minivans, etc. Hence, the controller 440 may further determine the number of parking spaces available for each type of vehicle in the parking garage 915. In these embodiments, display device 930 may be enabled to display the number of parking spaces available for each type of vehicle in the parking garage 915, for example via the ID component 935, or another ID component (e.g. an ID component for each number to be displayed, or all the number displayed on the ID component 935). The numbers may be displayed in any order, or any combination desired, in association with information identifying that the number is meant to be counting. For example, the display device 930 may display the total number of parking spaces available, the total number of parking spaces available for each type of vehicle, or a combination.

FIG. 11 depicts another non-limiting embodiment of a system 1100 for controlling an electrical device. The system 1100 is substantially similar to the system 900, with like elements depicted with like numbers. However, in system 1100, a monitored area comprises a floor 1115 of a parking garage, for example the parking garage 915, the floor 1115 containing a plurality of parking spaces, for example parking spaces 1116. Though not depicted, it is understood that some parking spaces comprise parked vehicles. The cameras 410 are mounted proximal an entrance 1120a and an exit 1120b to the floor, in a manner that enable the cameras 410 to capture images of vehicles entering and exiting the floor 1115 (e.g. overhead). A display device 1130, similar to the display device 930, is positioned near the entrance 1120a of the floor 1115 (e.g. adjacent the entrance, or overhead) to display the number of parking spaces available in the floor 1115. Hence, a driver of a vehicle will understand if it is worth stopping on the floor 1115 to park the vehicle. Note that only the information displayed by an ID component is depicted for simplicity; however it is understood that the display device 1130 further comprises an ID component and a switch, similar to that described above with reference to system 900. The determination of the number of parking spaces available on the floor 1115 is performed in a manner similar to determining the number of parking spaces available in the parking garage 915, described above. Similarly, the number of parking spaces available for a type of vehicle may also be determined. The display device 1130 may hence display the total number of parking spaces available on the floor 1115, the total number of parking spaces available for each type of vehicle on the floor 1115, or a combination. Further, each floor of the parking garage 915 may be similarly equipped such that a driver entering the garage may decide which floor to park on by viewing the display devices 1130 on each floor.

FIG. 12 depicts another non-limiting embodiment of a system 1200 for controlling an electrical device. The system 1200 is substantially similar to the system 1100, with like elements depicted with like numbers. However, in system 1200, a monitored area comprises an aisle 1215 (for example aisle 1215a and 1215b) of the floor 1115, each aisle 1215 containing a plurality of parking spaces, for example parking spaces 1116. In the depicted non-limiting embodiment, each aisle 1215 comprises eight parking spaces, though the number of parking spaces in each aisle 1215 is not particularly limiting. Further, four vehicles are parked in aisle 1215a, and one vehicle is parked in aisle 1215b.

The cameras 410 are mounted proximal entrances 1220 of each aisle 1215, in a manner that enables the cameras 410 to capture images of vehicles entering and exiting each aisle 1215 (e.g. overhead). A display device 1230, similar to the display device 1130, is positioned near at least one entrance 1230 of each aisle 1215 (e.g. adjacent the entrance, or overhead) to display the number of parking spaces available in the aisle 1215. Hence, a driver of a vehicle will understand if it is worth entering the aisle 1215 to park the vehicle. Note that only the information displayed by an ID component is depicted for simplicity, however it is understood that the display device 1230 further comprises an ID component and a switch, similar to the display device 1130. The determination of the number of parking spaces available in the aisle 1215 is performed in a manner similar to determining the number of parking spaces available in the parking garage 915, described above. Similarly, the number of parking spaces available for a type of vehicle may also be determined. The display device 1230 may hence display the total number of parking spaces available in the aisle 1215, the total number of parking spaces available for each type of vehicle in the aisle 1215, or a combination. Further, each aisle of each floor of the parking garage 915 may be similarly equipped such that a driver entering the garage may first decide which floor to park on by viewing the display devices 1130 on each floor, and then decide which aisle to park in by viewing the display devices 1230 at each aisle. In some of these embodiments, a display device at the entrance to the parking garage may further be enabled to display the number of parking spaces available on each floor and/or each aisle. In other embodiments, a display device at the entrance to a floor may be further enabled to display the number of parking spaces available in each aisle.

Furthermore, there is also a possibility that a driver will ignore the display devices and enter the parking garage/floor/aisle anyhow, even if the display devices indicate that there are few or no parking spaces available, or further that they will drive around the parking garage/floor/aisle without actually parking. In addition, there is an inherent assumption that the number of vehicles present in the parking garage, on each floor, and each aisle is indicative of the number of parking spots that are occupied, even if a vehicle has not actually parked as of yet (i.e. the vehicles entering the parking garage/floor/aisle will be counted as described above, and the number of parking spaces available that are displayed on the display devices will still be decreased (and subsequently increased when they leave the parking garage/floor/aisle) whether the vehicle parks or not). However, there is an inherent advantage to this situation as, even though the parking spaces may not yet be occupied (or further may not be occupied, or are already occupied), a subsequent driver will understand from the numbers displayed at the display devices that any parking spaces that may be presently available, may soon not be as there are already vehicles in the parking garage/floor/aisle that may soon occupy any available spaces. Hence the driver may proceed to the next parking garage/floor/aisle, as appropriate, and not waste time looking for parking spaces that may not presently be there, or further enter a parking garage/floor/aisle that is crowded with other vehicles looking for parking spaces.

Indeed, embodiments depicted in FIGS. 9 through 12 inherently serve to reduce emissions in vehicles as by reading the information displayed at each display device, a driver will reduce the amount of time spent looking for a parking space, and hence reduce the amount of time the vehicle being driven is in operation. Further, embodiments depicted in FIGS. 9 through 12 inherently serve to reduce wear in vehicles as, while looking for a parking space, the vehicle is often subjected to rapid starting and stopping, braking, shifting gears, etc. Hence by reducing the amount of time spent looking for a parking space, the present invention reduces the amount of starting and stopping and the accompanying wear on the vehicle.

Embodiments depicted in FIGS. 9 through 12 further provide a parking management system to parking management companies that is an economical alternative to current systems based on individual installation of IR based detectors at each parking space in parking garage, which are inherently costly and prone to failure due to the large number of detectors that need to be installed within the garage. Further, embodiments depicted in FIGS. 9 through 12 provide a parking management system to parking management companies that may easily be retrofitted within an existing parking garage.

Attention is now directed to FIG. 13, which depicts a particular non-limiting embodiment of a display device 1300 which comprises a case 1305 and a camera 1310, similar to the camera 410 described above. The case 1305 may further be attachable to brackets etc. such that the display device 1300 may be mounted above an entrance or exit to a parking garage, a floor of a parking garage or an aisle of a parking garage. The display device 1300 further comprises a radio 1311, similar to the radio 411 or the radio 811, an ID component 1335, similar to the ID component 935, and a switch 1350, similar to the switch 950. The antenna of the radio 1311 may be mounted internally or externally (as depicted) to the display device 1300. The camera 1310 and the switch 1350 are in communication with the radio 1311, such that the camera 1310 transmits images to the controller 440, as described above, and the switch 1350 receives control signals from the controller 440, also as described above, to trigger control of the ID component 1335. The camera 1310 is mounted inside the display device 1300, and an aperture 1360 is provided in the case 1305 (e.g. an opening in the case 1305, or a transparent area of the case 1305) such that the camera 1310 can capture images of vehicles passing beneath the display device 1300, when the display device 1300 is mounted in a parking garage. In some embodiments, the lens of the camera 1310 may be incorporated into the aperture 1360. The display device 1300 may be used in place of the display device 930, the camera 410a and the radio 411a of FIG. 9, the display device 1130, the camera 410 and the radio 411 of FIG. 11 and/or the display device 1230, the camera 410 and the radio 411 of FIG. 12.

Attention is now directed to FIG. 14a which depicts the camera 410 mounted above an entrance or an exit to a parking garage/floor/aisle, as described above, such that images of vehicles, such as an automobile 1410, when they pass under the camera 410, and through a field of view 1420 of the camera 410. The entrance or an exit to a parking garage/floor/aisle has a width D, and is defined by barriers 1415. Barriers 1415 may be concrete blocks, walls, floor markings, or any other suitable indicator of the entrance (or exit) of the parking garage/floor/aisle. An alternative embodiment is depicted in FIG. 14b, in which the entrance or an exit to a parking garage/floor/aisle has a width D1 greater than D, and the field of view 1420 of a single camera 410 may not be sufficient to capture images over the entire area of the entrance (or exit). Hence, two (or more) cameras 410 are mounted adjacent to each other, the cameras 410 at an angle to each other, such that the field of view 1420 of each camera 410 overlaps. In this manner, a wider area is captured in the images transmitted to the controller 440. In some embodiments, each of the cameras 410 transmit images via a single radio 411 (as depicted), while in other embodiments each camera 410 may comprise a radio 411, and transmit images via the radio 411 (i.e. a radio for each camera).

In some embodiments, the system 900, the system 1100 and/or the system 1200 may further comprise at least one remote control apparatus for controlling the associated system, and resetting the number displayed at each display device in each associated system, in the event that an error in counting triggering shapes occurs. The remote control apparatus may be similar to the remote control apparatus described above with reference to systems 400 and 800.

Those skilled in the art will appreciate that in some embodiments, the functionality of the controller 440 may be implemented using pre-programmed hardware or firmware elements (e.g., application specific integrated circuits (ASICs), electrically erasable programmable read-only memories (EEPROMs), etc.), or other related components. In other embodiments, the functionality of the controller 440 may be achieved using a computing apparatus that has access to a code memory (not shown) which stores computer-readable program code for operation of the computing apparatus. The computer-readable program code could be stored on a medium which is fixed, tangible and readable directly by these components, (e.g., removable diskette, CD-ROM, ROM, fixed disk, USB drive), or the computer-readable program code could be stored remotely but transmittable to these components via a modem or other interface device connected to a network (including, without limitation, the Internet) over a transmission medium. The transmission medium may be either a non-wireless medium (e.g., optical or analog communications lines) or a wireless medium (e.g., microwave, infrared, free-space optical or other transmission schemes) or a combination thereof.

Persons skilled in the art will appreciate that there are yet more alternative implementations and modifications possible for implementing the embodiments, and that the above implementations and examples are only illustrations of one or more embodiments. The scope, therefore, is only to be limited by the claims appended hereto.

What is claimed is:

1. A method of controlling an electrical device, comprising processing at least one image of at least one moving entity for determining when the at least one moving entity is at least one of entering and exiting a monitored area, and for determining when the at least one moving entity comprises at least one triggering shape; and when the at least one moving entity is determined to be at least one of entering and exiting the monitored area, and the at least one moving entity comprises the at least one triggering shape, triggering control of the electrical device and triggering a counter for counting triggering shapes present in the monitored area;

wherein when the at least one moving entity is determined to be exiting the monitored area, and the at least one moving entity comprises at least one triggering shape, triggering the counter comprises triggering the counter to decrement by the number of triggering shapes, and triggering control of the electrical device comprises triggering control of the electrical device to a state different from a present state, when the counter falls below a threshold number.

2. The method of claim 1, further comprising receiving the at least one image via at least one camera mounted proximal to at least one entrance to the monitored area.

3. The method of claim 1, wherein the processing the at least one image for determining when the at least one moving entity is at least one of entering and exiting a monitored area comprises processing at least one image to determine a direction of movement of the at least one moving entity.

4. The method of claim 1, wherein the processing the at least one image for determining when the at least one moving entity comprises at least one triggering shape, comprises comparing the at least one image to at least one record of triggering shapes.

5. The method of claim 4, wherein the at least one record of triggering shapes is stored in a database.

6. The method of claim 4, further comprising receiving an indication of a preference of the behaviour of the electrical device during future control of the electrical device and saving the indication of a preference in association with the triggering shape.

7. The method of claim 4, wherein the at least one record of triggering shapes further comprises an indication of a state to which the at least one electrical device is controlled responsive to the triggering control of the electrical device.

8. The method of claim 1, further comprising determining when the at least one moving entity comprises at least one non-triggering shape by comparing the at least one image to at least one record of non-triggering shapes.

9. The method of claim 1, wherein the triggering control of the electrical device comprises triggering at least one of activation or deactivation of the electrical device.

10. The method of claim 1, wherein the triggering control of the electrical device comprises triggering control of a given feature of the electrical device.

11. The method of claim 1, further comprising determining when the at least one triggering shape is associated with the electrical device, and the triggering control of the electrical device occurs only when the at least one triggering shape is associated with the electrical device.

12. The method of claim 11, further comprising determining when the at least one triggering shape is associated with a given feature of the electrical device, and the triggering control comprises triggering control of the given feature.

13. The method of claim 11, further comprising detecting an adjustment of the electrical device following the triggering control of the electrical device.

14. The method of claim 13, wherein the detecting an adjustment of the electrical device following the control of the electrical device occurs within a given time period.

15. The method of claim 13, further comprising saving a record of the adjustment in association with the at least one triggering shape.

16. The method of claim 15, further comprising processing the record of the adjustment to change behaviour of the electrical device when triggering control of the electrical device.

17. The method of claim 11, wherein the determining when the at least one triggering shape is associated with the electrical device is based on a size of the at least one triggering shape.

18. The method of claim 11, wherein the determining when the at least one triggering shape is associated with the electrical device is based on distinguishing when the triggering shape is an adult or a child.

19. The method of claim 1, further comprising processing the at least one image for determining when the at least one moving entity comprises a plurality of entities and, when so, determining a shape of each of the plurality of entities, and wherein the determining when the at least one moving entity comprises at least one triggering shape comprises determining when the shape of each of the plurality of entities comprises a triggering shape and the triggering the counter comprises triggering the counter to increment by the number of triggering shapes in the plurality of entities.

20. The method of claim 1, wherein the triggering control of the electrical device comprises triggering control of the device to a given state, is the electrical device is not presently in the given state.

21. The method of claim 1, wherein the at least one moving entity comprises a vehicle, the monitored area comprises at least one of a parking garage, at least one floor of the parking garage and at least one aisle of the floor, and the counter comprises a display device for displaying the number of parking spaces available in the monitored area.

22. A controller for triggering control of at least one electrical device, comprising
an interface enabled to communicate with at least one camera for monitoring at least one entrance of at least one monitored area associated with the at least one electrical device, such that the at least one image of at least one moving entity may be received from the at least one camera, the interface further enabled to transmit control signals to at least one switch for controlling the at least one electrical device; and
a processor enabled for:
processing the at least one image of the at least one moving entity, for determining when the at least one moving entity is at least one of entering and exiting the at least one monitored area, and for determining when the at least one moving entity comprises at least one triggering shape; and
when the at least one moving entity is determined to be at least one of entering and exiting the at least one monitored area, and the at least one moving entity comprises the at least one triggering shape, triggering control of the at least one electrical device by transmitting at least one control signal to the at least one switch, and triggering at least one counter for counting triggering shapes present in the at least one monitored area;
wherein when the at least one moving entity is determined to be exiting the monitored area, and the at least one moving entity comprises at least one triggering shape, triggering the counter comprises triggering the counter to decrement by the number of triggering shapes, and triggering control of the electrical device comprises triggering control of the electrical device to a state different from a present state, when the counter falls below a threshold number.

23. A system for controlling at least one electrical device comprising:
at least one camera mounted proximal to at least one of an entrance and an exit of a monitored area associated with the at least one electrical device, such that the at least one camera is enabled to capture images of moving entities that are at least one of entering and exiting the monitored area;

at least one switch for controlling the at least one electrical device; and a controller for triggering control of the at least one electrical device, the controller comprising:

an interface enabled to communicate with the at least one camera, such that images of moving entities may be received from the at least one camera, the interface further enabled to transmit control signals to the at least one switch for controlling the at least one electrical device; and a processor enabled for:

processing the images, for determining when the moving entities are at least one of entering and exiting the at least one monitored area, and for determining when the moving entities comprise at least one triggering shape; and when the moving entities are determined to be at least one of entering and exiting the at least one monitored area, and the moving entities comprise the at least one triggering shape, triggering control of the at least one electrical device by transmitting at least one control signal to the at least one switch, and triggering at least one counter for counting triggering shapes present in the at least one monitored area;

wherein when the at least one moving entity is determined to be exiting the monitored area, and the at least one moving entity comprises at least one triggering shape, triggering the counter comprises triggering the counter to decrement by the number of triggering shapes, and triggering control of the electrical device comprises triggering control of the electrical device to a state different from a present state, when the counter falls below a threshold number.

* * * * *